United States Patent
Wolfson et al.

(10) Patent No.: US 12,455,717 B2
(45) Date of Patent: Oct. 28, 2025

(54) POWER MANAGEMENT FOR AUDIO ALERTS FOR ELECTRONIC DEVICES

(71) Applicant: Apple Inc., Cupertino, CA (US)

(72) Inventors: Bryce D. Wolfson, San Jose, CA (US); Charles C. Hoyt, Pacifica, CA (US); David W. Robison, San Jose, CA (US); Douglas A. MacKay, San Mateo, CA (US)

(73) Assignee: Apple Inc., Cupertino, CA (US)

( * ) Notice: Subject to any disclaimer, the term of this patent is extended or adjusted under 35 U.S.C. 154(b) by 114 days.

(21) Appl. No.: 18/372,693

(22) Filed: Sep. 25, 2023

(65) Prior Publication Data

US 2025/0037549 A1   Jan. 30, 2025

Related U.S. Application Data

(60) Provisional application No. 63/528,634, filed on Jul. 24, 2023.

(51) Int. Cl.

| | |
|---|---|
| *G06F 3/16* | (2006.01) |
| *G06F 1/3212* | (2019.01) |
| *G06F 1/3234* | (2019.01) |
| *G06F 1/3296* | (2019.01) |
| *G08B 3/00* | (2006.01) |

(52) U.S. Cl.
CPC ............ *G06F 3/165* (2013.01); *G06F 1/3212* (2013.01); *G06F 1/325* (2013.01); *G06F 1/3296* (2013.01); *G08B 3/00* (2013.01)

(58) Field of Classification Search
CPC ....................................................... G06F 3/165
See application file for complete search history.

(56) References Cited

U.S. PATENT DOCUMENTS

| | | | | |
|---|---|---|---|---|
| 6,087,949 | A * | 7/2000 | Yanagida | H04B 1/036 |
| | | | | 379/433.06 |
| 10,424,189 | B2 * | 9/2019 | Daoura | G08B 25/10 |
| 2013/0142360 | A1 * | 6/2013 | Potard | H03G 3/20 |
| | | | | 381/98 |
| 2016/0063850 | A1 * | 3/2016 | Yang | H04M 1/72454 |
| | | | | 340/539.22 |
| 2020/0404423 | A1 * | 12/2020 | Dusan | G08B 25/10 |
| 2021/0120351 | A1 * | 4/2021 | Zhao | H04R 3/12 |

OTHER PUBLICATIONS

International Search Report and Written Opinion from PCT/US2024/039060, dated Oct. 22, 2024, 12 pages.

* cited by examiner

*Primary Examiner* — Travis R Hunnings
(74) *Attorney, Agent, or Firm* — BAKERHOSTETLER

(57) ABSTRACT

Aspects of the subject technology relate to providing audio alerts with electronic devices. An audio alert may be provided, in part, using power management operations that manage one or more both of the instantaneous power usage for providing the audio alert, and the long-term power usage for providing the audio alert.

20 Claims, 12 Drawing Sheets

POWER MANAGEMENT FOR AUDIO ALERTS FOR ELECTRONIC DEVICES

CROSS REFERENCE TO RELATED APPLICATIONS

This application claims the benefit of priority to U.S. Provisional Patent Application No. 63/528,634, entitled, "POWER MANAGEMENT FOR AUDIO ALERTS FOR ELECTRONIC DEVICES", filed on Jul. 24, 2023, the disclosure of which is hereby incorporated herein in its entirety.

TECHNICAL FIELD

The present description relates, generally, to electronic devices, including, for example, to power management for audio alerts for electronic devices.

BACKGROUND

Electronic devices such as computers, media players, cellular telephones, wearable devices, and headphones are often provided with speakers for generating audio output from the device and microphones for receiving audio input to the device.

BRIEF DESCRIPTION OF THE DRAWINGS

Certain features of the subject technology are set forth in the appended claims. However, for purpose of explanation, several aspects of the subject technology are set forth in the following figures.

DETAILED DESCRIPTION

Figure 1:
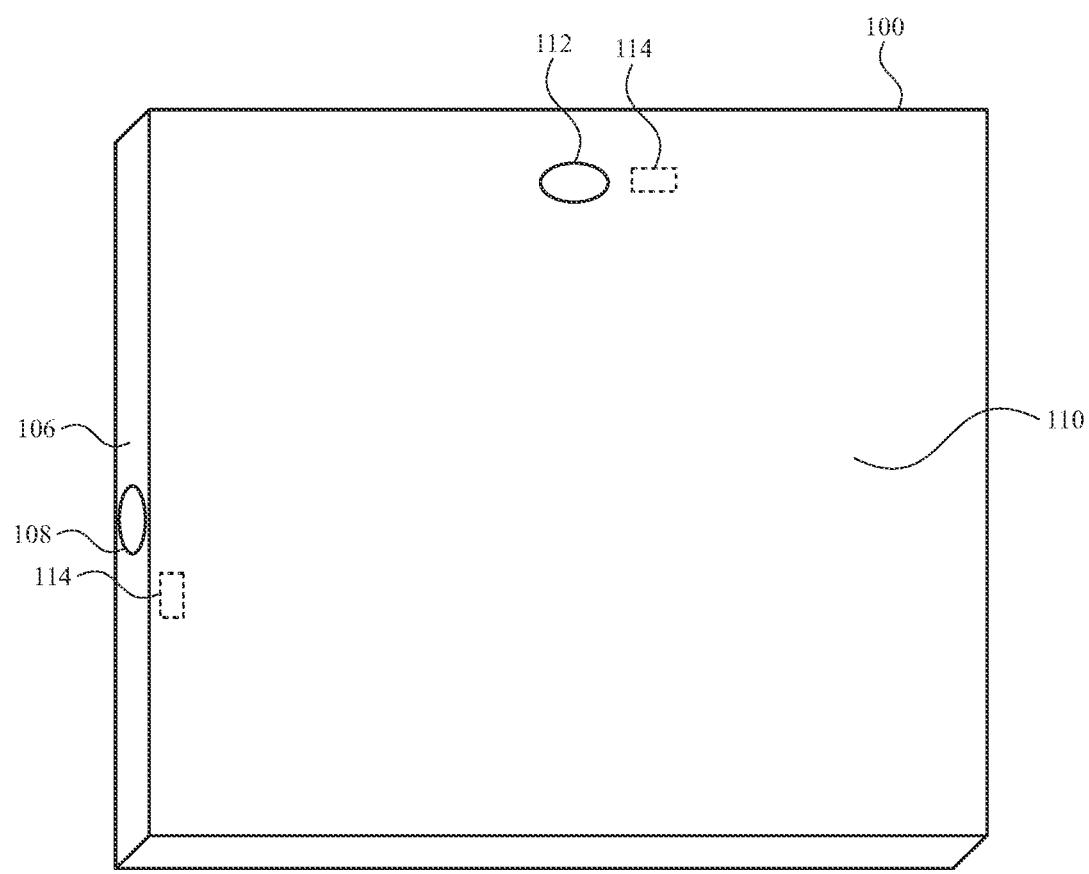
FIG. 1 illustrates a perspective view of an example electronic device having a speaker in accordance with various aspects of the subject technology.

The detailed description set forth below is intended as a description of various configurations of the subject technology and is not intended to represent the only configurations in which the subject technology may be practiced. The appended drawings are incorporated herein and constitute a part of the detailed description. The detailed description includes specific details for the purpose of providing a thorough understanding of the subject technology. However, it will be clear and apparent to those skilled in the art that the subject technology is not limited to the specific details set forth herein and may be practiced without these specific details. In some instances, well-known structures and components are shown in block diagram form in order to avoid obscuring the concepts of the subject technology.

Electronic devices such as a mobile phones, portable music players, tablet computers, laptop computers, wearable devices such as smart watches, headphones, earbuds, other wearable devices, and the like, often include one or more audio transducers such as a microphone for receiving sound input, and/or a speaker for generating sound. In one or more implementations, one or more speakers of an electronic device may be operated to generate an audio alert, such as an emergency alert. As one illustrative example, an electronic device such as a smart watch may generate an emergency audio alert (e.g., responsive to a device detection of an emergency condition, or to a user request to generate the emergency audio alert) to aid in locating a user of the electronic device when the user of the electronic device becomes lost or injured.

In one or more implementations, it may be desirable to generate an audio alert at a high volume (e.g., a high acoustic amplitude) to allow the audio alert to be heard from as great a distance as possible. It may also be desirable to continue providing the audio alert for an extended period of time (e.g., to allow time for searchers or other people to hear and locate the audio alert). However, electronic devices that may be worn or carried by user, and used to generate an audio alert, may be powered by a limited power source, such as a battery. Generating high acoustic amplitude audio outputs can consume large amount of instantaneous power and long-term average power, and continuing to provide the audio alerts over an extended period of time can drain the battery of an electronic device, thereby shortening the total amount of time over which the audio alert can continue.

Aspects of the subject technology can provide power management, including instantaneous and/or long-term power management, for an electronic device outputting audio alerts (e.g., emergency alerts). For example, instantaneous power management may include obtaining power information for an upcoming audio alert, and determining whether a current power budget for the electronic device is sufficient to generate the upcoming audio alert based on the power information. If the current power budget is insufficient, the electronic device can modify the audio content of the audio alert to consume less power. In this way, an audio alert that could consume instantaneous device power in a way that would brown out or otherwise overwhelm the electrical system of the device (or that would cause a system process of the device to lower the acoustic amplitude of the alert) can be avoided, while still being able to provide an audio alert that may correspond to, for example, an emergency situation. The long-term power management may include selecting patterns of sounds to be included in ongoing (e.g., repeating) audio alerts, such that the rate of power consumption by the generation of the audio alerts can be maintained over time. In this way, the long-term rate of consumption of battery power can slow over time to allow audio alerts to continue for an extended period of time (e.g., until the electronic device and/or a user of the electronic device is located). As discussed herein, the instantaneous and long-term power management operations described herein can be utilized separately or in various combinations.

An illustrative electronic device including a speaker is shown in FIG. 1. In the example of FIG. 1, electronic device 100 has been implemented using a housing that is sufficiently small to be portable and carried or worn by a user (e.g., electronic device 100 of FIG. 1 may be a handheld electronic device such as a tablet computer or a cellular telephone or smart phone or a wearable device such as a smart watch, a pendant device, a headlamp device, or the like). In the example of FIG. 1, electronic device 100 includes a display such as display 110 mounted on the front of a housing 106. Electronic device 100 may include one or more input/output devices such as a touch screen incorporated into display 110, a button, a switch, a dial, a crown, a haptic component, and/or other input output components disposed on or behind display 110 or on or behind other portions of housing 106. Display 110 and/or housing 106 may include one or more openings to accommodate a button, a speaker, a light source, or a camera (as examples).

In the example of FIG. 1, housing 106 includes an opening 108. For example, opening 108 may form a port for an audio component. In the example of FIG. 1, the opening 108 forms a speaker port for a speaker 114 disposed within the housing 106. In this example, the speaker 114 is offset from the opening 108, and sound from the speaker may be routed to and through the opening 108 by one or more internal device structures (as discussed in further detail hereinafter).

In the example of FIG. 1, display 110 also includes an opening 112. For example, opening 112 may form a port for an audio component. In the example of FIG. 1, the opening 112 forms a speaker port for a speaker 114 disposed within the housing 106 and behind a portion of the display 110. In this example, the speaker 114 is offset from the opening 112, and sound from the speaker may be routed to and through the opening 112 by one or more device structures.

In various implementations, the housing 106 and/or the display 110 may also include other openings, such as openings for one or more microphones, one or more pressure sensors, one or more light sources, or other components that receive or provide signals from or to the environment external to the housing 106. Openings such as opening 108 and/or opening 112 may be open ports or may be completely or partially covered with a permeable membrane or a mesh structure that allows air and/or sound to pass through the openings. Although two openings (e.g., opening 108 and opening 112) are shown in FIG. 1, this is merely illustrative. One opening 108, two openings 108, or more than two openings 108 may be provided on the one or more sidewalls of the housing 106, on a rear surface of housing 106 and/or a front surface of housing 106. One opening 112, two openings 112, or more than two openings 112 may be provided in the display 110. In some implementations, one or more groups of openings in housing 106 and/or groups of openings 112 in display 110 may be aligned with a single port of an audio component within housing 106. Housing 106, which may sometimes be referred to as a case, may be formed of plastic, glass, ceramics, fiber composites, metal (e.g., stainless steel, aluminum, etc.), other suitable materials, or a combination of any two or more of these materials.

The configuration of electronic device 100 of FIG. 1 is merely illustrative. In other implementations, electronic device 100 may be a computer such as a computer that is integrated into a display such as a computer monitor, a laptop computer, a media player, a gaming device, a navigation device, a computer monitor, a television, a headphone, an earbud, or other electronic equipment. As discussed herein, in some implementations, electronic device 100 may be provided in the form of a wearable device such as a smart watch. In one or more implementations, housing 106 may include one or more interfaces for mechanically coupling housing 106 to a strap or other structure for securing housing 106 to a wearer.

Figure 2:
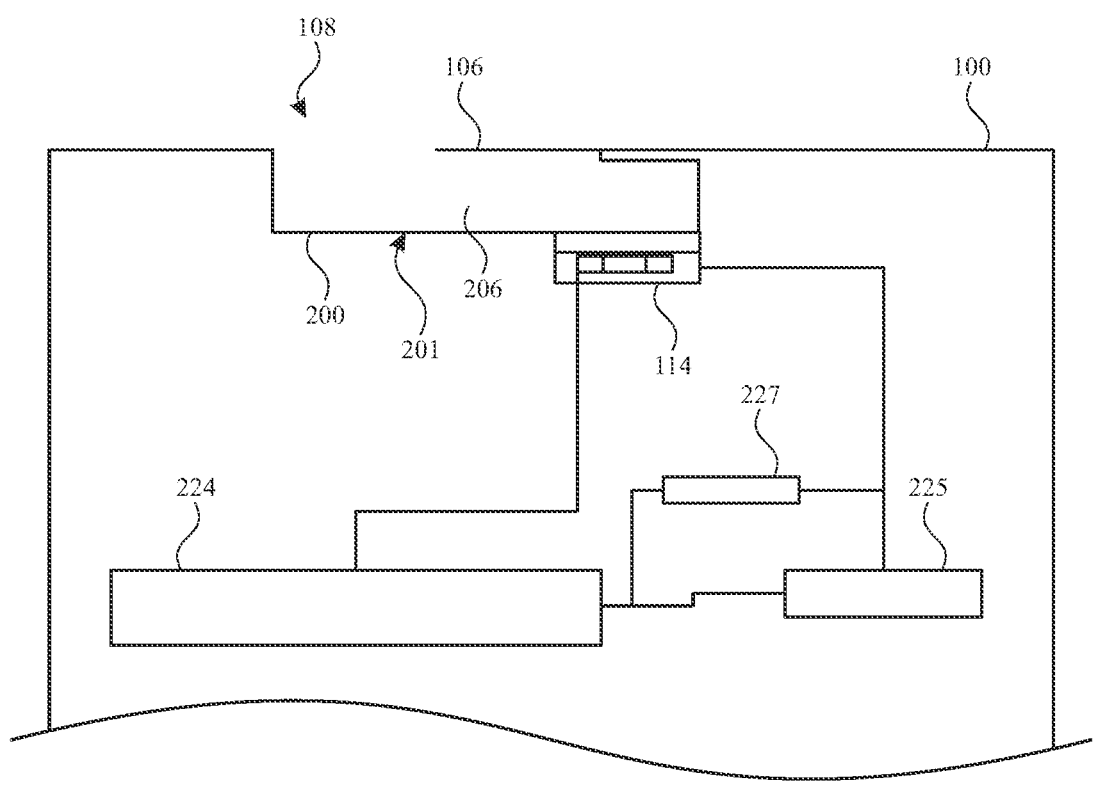
FIG. 2 illustrates a cross-sectional view of a portion of an example electronic device having a speaker in accordance with various aspects of the subject technology.

For example, FIG. 2 illustrates a cross-sectional side view of a portion of the electronic device 100 including a speaker 114. In this example, a front volume of the speaker 114 may be fluidly and acoustically coupled (e.g., via an acoustic duct 206) to the opening 108 in the housing 106. In one or more implementations, the acoustic duct 206 may be formed by a speaker housing 200 of a speaker module 201 in which the speaker 114 is disposed. In one or more other implementations, the acoustic duct 206 may be formed, entirely or in part, by one or more other device structures that guide sound generated by the speaker 114 through the opening 108 to the environment external to the housing 106. In the example of FIG. 2, the speaker 114 is spatially offset from the opening 108. However, in one or more others implementations, the speaker 114 may be aligned with the opening 108. In one or more implementations, the speaker 114 may be a compact speaker having a cross-sectional area of less than, for example two hundred $mm^2$, less than one hundred $mm^2$, or less than fifty $mm^2$.

In the example of FIG. 2, the speaker 114 may include speaker circuitry such as a voice coil, a magnet, and/or other speaker circuitry. In one or more implementations, the electronic device 100 may also include other components and/or circuitry, such as a battery 224, a haptic component 227, and/or device circuitry 225. Device circuitry 225 may include one or more processors, memory, acoustic components, mechanical components, electronic components, or any other suitable components of an electronic device. As shown, device circuitry 225, a haptic component 227, and/or speaker 114 may be powered by the battery 224. In one or more implementations, the device circuitry 225 may also include one or more sensors, such as an inertial sensor (e.g., one or more accelerometers, gyroscopes, and/or magnetometers), a heart rate sensor, a blood oxygen sensor, a positioning sensor, a microphone, and/or the like.

The power consumed by generating an audio output with the speaker 114 may affect (e.g., reduce) the instantaneous system voltage that is provided by the battery 224 to the device circuitry 225 of the electronic device 100 during operation of the speaker 114. Over time, operating the speaker 114 (e.g., to generate audio alerts and/or other audio content) may reduce the charge stored by the battery 224. In one or more implementation, the device circuitry 225 may include circuitry configured to prevent the operation of the speaker 114 (or any other component of the electronic device) from consuming power in a way that reduces the system voltage provided by the battery 224 below a threshold voltage. For example, the device circuitry may attenuate the acoustic amplitude of audio output generated by the speaker 114 if the device circuitry determines that the speaker 114 is causing the system voltage provided by the battery 224 to droop below a threshold voltage. However, in various use cases, including in the use case of providing an audio alert with the speaker 114, attenuating the acoustic amplitude of the audio output can reduce the effectiveness of the audio output (e.g., by reducing the distance at which the audio alert can be heard, such as by a human). It may therefore be desirable to manage the power consumption by the speaker 114, before the device circuitry 225 intervenes to reduce the acoustic amplitude, such as by managing the content of the audio alert before the content is provided to the speaker for output.

In accordance with aspects of the subject disclosure, power management for audio alerts using a speaker, such as the speaker 114, of an electronic device, such as the electronic device 100 are provided.

Figure 3:
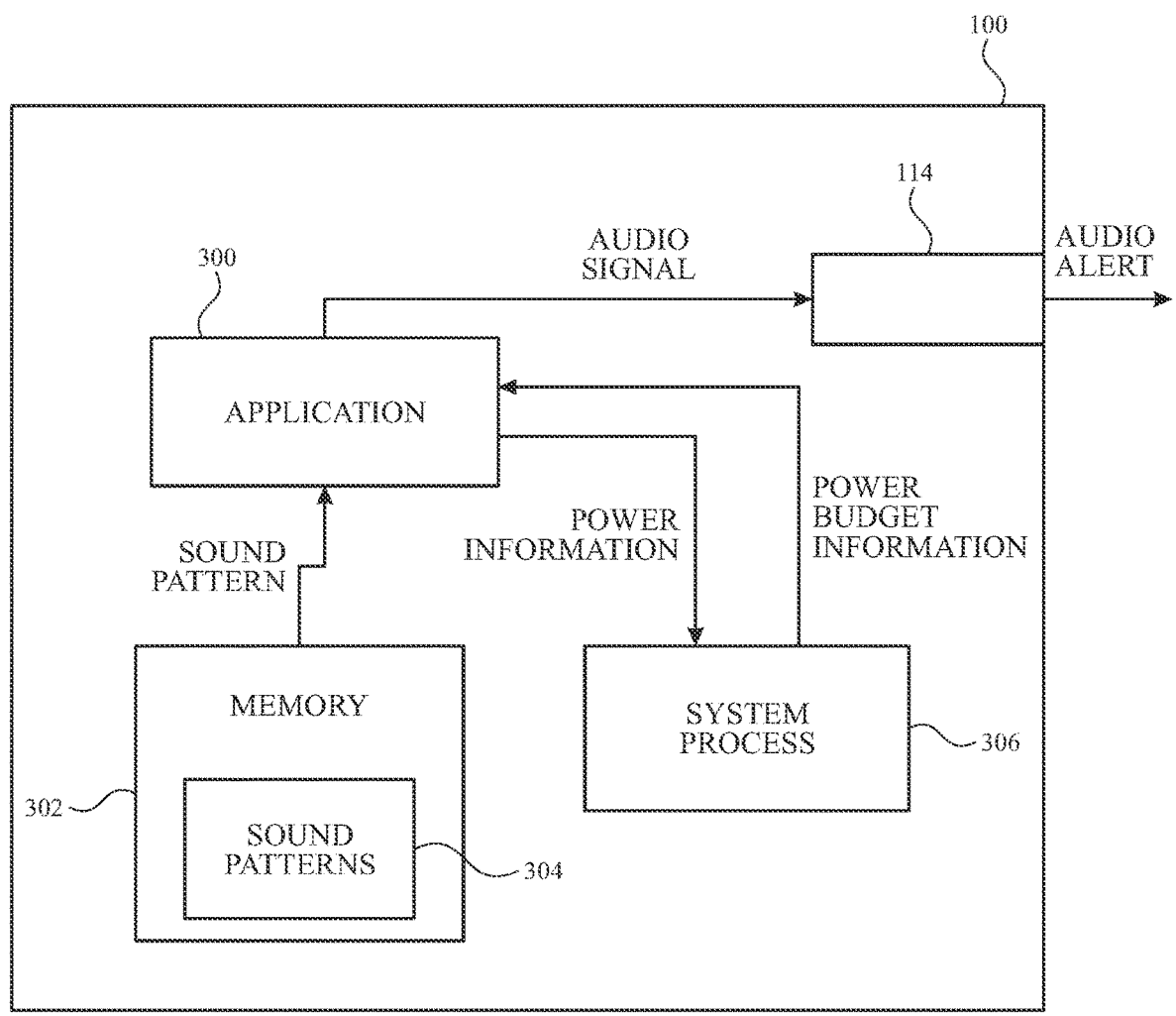
FIG. 3 illustrates a schematic diagram of an electronic device providing power management for audio alerts in accordance with various aspects of the subject technology.

FIG. 3 illustrates a schematic diagram of the electronic device 100 providing power management for audio alerts, in accordance with aspects of the subject disclosure. As shown in FIG. 3, the electronic device 100 may include an application 300 that is capable of generating audio content and/or control signals for the speaker 114. For example, the application 300 may provide an audio signal to the speaker 114 that causes the speaker 114 to generate an audio alert. The audio signal may include or encode audio content, such as one or more patterns of sound (e.g., sound patterns). In the example of FIG. 3, the application 300 obtains a sound pattern from sound patterns 304 that are stored in memory 302 of the electronic device 100. The application 300 may then generate the audio signal based on the obtained sound pattern, such that the speaker 114, when operated according to the audio signal, outputs the obtained sound pattern in the audio alert. Examples of sound patterns are described in further detail hereinafter in connection with FIGS. 4-14. In the example of FIG. 3, the sound patterns 304 are stored in the memory 302 of the electronic device. However, in one or more other implementations, the application 300 may include code for generating the sound patterns 304 (e.g., on-the-fly, rather than pre-storing then retrieving sound patterns 304).

As discussed herein, generating the audio signal with the obtained sound pattern could cause the resulting operation of the speaker 114 to reduce a system voltage provided by the battery 224 of the electronic device 100 below a threshold voltage (e.g., which could brown out or otherwise negatively affect the electrical system of the electronic device). In order, for example, to manage the power consumption by the audio alert to avoid causing the system voltage provided by the battery 224 of the electronic device 100 to droop below the threshold voltage, the application 300 may obtain power information for the obtained sound pattern, before generating the audio signal according to the obtained sound pattern. For example, the power information may be a previously determined amount of power (and/or other power profile information) that would be consumed by the speaker 114 outputting the obtained sound pattern. The previously determined amount of power may include a previously determined peak amount of power that would be consumed by the speaker 114 at any instant during the output of the obtained sound pattern, and/or a cumulative amount of power that would be consumed by the speaker 114 by the output of the obtained sound pattern (e.g., at any particular instant during the output of the obtained sound pattern, or at the conclusion of the output of the obtained sound pattern).

For example, the electronic device 100 may store (or be configured to generate) a finite number of sound patterns for audio alerts and, prior to operation of the electronic device 100 to generate an audio alert in an end user scenario (e.g., during manufacturing or assembly of the electronic device 100 or during a startup or enrollment process performed by the electronic device 100), a power profile may be generated for each of the sound patterns. For example, the power profile for each sound pattern may indicate the amount of power that would be consumed by the speaker 114, and/or a voltage drop that would be caused by the speaker 114 (e.g., instantaneously at any given instant during the output of the sound pattern, cumulatively at any given instant during the output of the sound pattern, and/or cumulatively at the end of the output of the sound pattern), if the speaker outputs that sound pattern.

As illustrated in FIG. 3, prior to generating the audio signal corresponding to an obtained pattern of sounds, the application 300 may provide the power information to a system process 306 (e.g., a power manager) of the electronic device. The system process 306 may, responsively, provide power budget information to the application 300 based on the power information received from the application 300. For example, the power budget information may include an amount of power that is available for generation of the obtained sound pattern, or may include an indication of whether or not sufficient power is available for generation of the obtained sound system. For example, the system process 306 may compare the power information for the obtained sound pattern with current power state information for the electronic device, determine whether sufficient power is available for generation of the obtained sound pattern based on the comparison, and provide an approval or disapproval of the obtained sound pattern to the application 300.

If the power budget information received from the system process 306 indicates that the electronic device 100 has sufficient power for generation of the obtained sound pattern (e.g., without causing the system voltage of the electronic device to droop below a threshold), the application 300 may generate the audio signal using the obtained sound pattern, and provide the audio signal to the speaker 114 for generation of the audio alert including the obtained sound pattern. If the power budget information received from the system process 306 indicates that the electronic device 100 has insufficient power for generation of the obtained sound pattern (e.g., generating the obtained sound pattern with the speaker 114 would cause the system voltage of the electronic device to droop below a threshold), the application 300 may obtain a different sound pattern (e.g., a sound pattern that uses less power to generate), generate the audio signal using the different sound pattern, and provide the audio signal to the speaker 114 for generation of the audio alert including the different sound pattern. In one or more implementations, the audio alert may include repeated outputs of one or more sound patterns, and the application 300 may provide the power information and receive the power budget information prior to output of each repeat of each of the one or more sound patterns.

Figure 4:
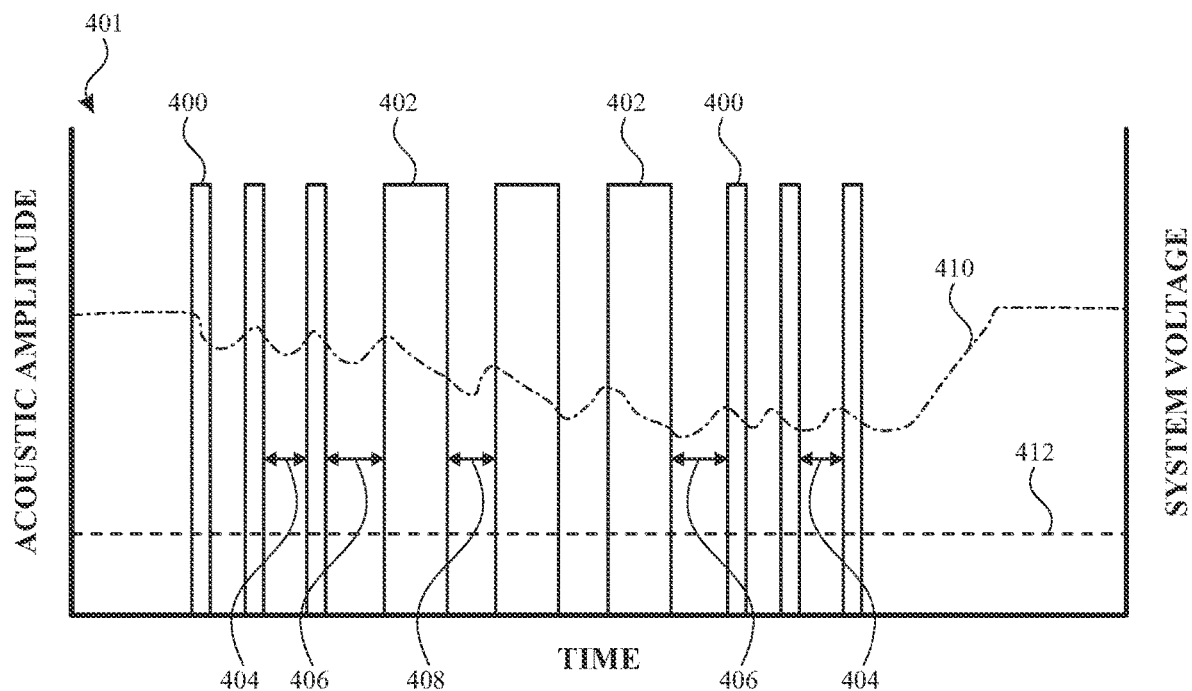
FIG. 4 illustrates an example of audio content for an audio alert in accordance with various aspects of the subject technology.

FIG. 4 illustrates an example of a pattern of sounds (e.g., a sound pattern) that may be output by the speaker 114 as part of an audio alert. In the example of FIG. 4, a sound pattern 401 is shown that includes a series of chirps (e.g., relatively short bursts of sounds separated from other bursts of sound by soundless gaps). For example, the chirps may include short chirps 400 and long chirps 402 (e.g., chirps that are longer, in time, than the short chirps 400) that form coded chirps. In this example, the sound pattern 401 forms a Morse code "S.O.S." pattern with three short chirps 400, followed by three long chirps 402, followed by three short chirps 400. However, this is merely illustrative, and other sets of coded or uncoded chirps may be provided, and coded chirps may encode a different message and/or may utilize a different coding scheme than Morse code.

As shown in the example of FIG. 4, the short chirps 400 are separated from each other by a spacing 404, the long chirps are separated from each other, in time, by a spacing 408, and the short chirps 400 are separate from the long chirps 402 by a spacing 406. In various use cases, the spacing 404, the spacing 406, and the spacing 408 may be the same or different spacings. In the example of FIG. 4, the acoustic amplitudes of the short chirps 400 and the long chirps 402 are the same. However, in other use cases, the acoustic amplitudes of the short chirps 400 may be different from each other and/or from the acoustic amplitudes of the long chirps 402. In one or more implementations, the acoustic amplitudes of the chirps may be set to allow the chirps to be heard by a human at a predetermined distance (e.g., at least four hundred to one thousand feet).

FIG. 4 also illustrates how a system voltage 410 of the electronic device 100 may be affected by the output of the sound pattern 401. In this example, the system voltage decreases during each chirp, partially recovers in the spacings 404, 406, and 408 between the chirps, and further decreases during each subsequent chirp. In the example of FIG. 4, a threshold system voltage 412 is also indicated, below which the electrical system of the electronic device 100 could brown out or a system process of the electronic device 100 could attenuate the acoustic amplitudes of the chirps to prevent such a brownout or other system failure. In the example of FIG. 4, the sound pattern 401 does not cause the system voltage 410 to fall below the threshold system voltage 412, but also does not allow the system voltage 410 to fully recover during the output of the sound pattern 401. It is appreciated that the system voltage 410 depicted in FIG. 4 and other figures herein is merely illustrative of the effect of operating a speaker, and may be different from the actual system voltage response of an electrical system of an electronic device.

Figure 5:
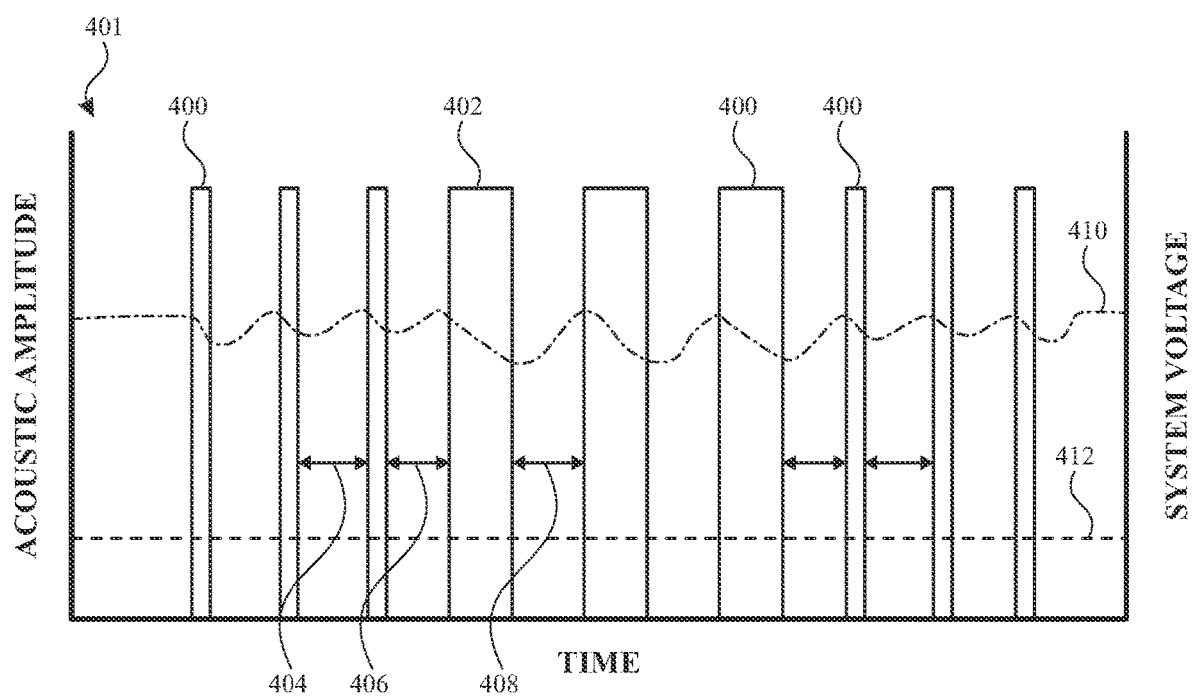
FIG. 5 illustrates another example of audio content for an audio alert in accordance with various aspects of the subject technology.

FIG. 5 illustrates another example, in which the sound pattern 401 is modified, relative to the sound pattern 401 of FIG. 4, to increase the spacings 404, the spacings 406, and the spacings 408 between the short chirps 400 and the long chirps 402. As shown in FIG. 5, increased spacings 404, 406, and 408 allow the system voltage 410 to recover further (e.g., completely) between the chirps. In this way, the sound pattern 401 can be modified (e.g., by increasing any or all of the spacings 404, the spacings 406, and/or the spacings 408) such that additional system power is available for other functions of the electronic device 100, and/or for a output of a subsequent sound pattern (e.g., a repeat of the same sound pattern or an output of a different sound pattern). In one or more use cases, if the system process 306 were to determine that the electronic device 100 does not have sufficient power at a given time to output the sound pattern 401 of FIG. 4, the application 300 may output the modified sound pattern of FIG. 5 or another sound pattern.

Figure 6:
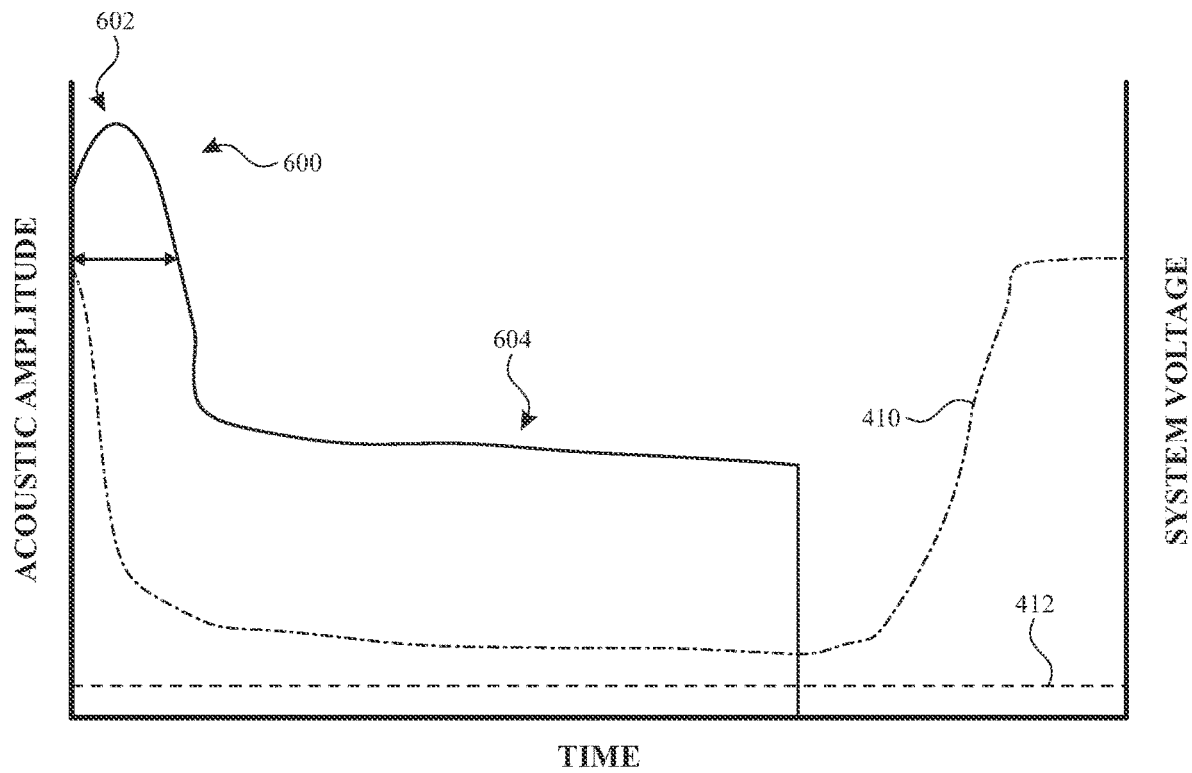
FIG. 6 illustrates an example of audio content that includes a siren sound in accordance with various aspects of the subject technology.

FIG. 6 illustrates another example of sound pattern that may be output by the speaker 114 as part of an audio alert. In the example of FIG. 6, a sound pattern 600 is shown that includes a siren sound having an initial peak 602 and a taper portion 604 that follows the initial peak 602. For example, the initial peak 602 may be provided with a relatively high peak acoustic amplitude for catching the attention of a person within audible range of the initial peak 602 and the taper portion 604 may provide a sustained audio output that allows a person who heard the initial peak 602 to confirm that the audio alert is being heard. By providing the taper portion 604 with a lower acoustic amplitude than the initial peak, a reduced amount of power may be used for outputting the overall sound pattern 600 (e.g., in comparison with maintaining the peak acoustic amplitude of the initial peak 602). By tapering the acoustic amplitude of the taper portion 604 over time, additional power savings can be achieved (e.g., in contrast with outputting a constant amplitude over time). In the example of FIG. 6, a single peak and a single taper portion are shown. However, a siren sound can have other acoustic curves with, for example, more than one peak, more than one taper portion, and/or other shapes and/or features.

FIG. 6 also illustrates how the system voltage 410 of the electronic device 100 may be affected by the output of the sound pattern 600. In this example, the system voltage decreases rapidly during output of the initial peak 602, and continues to decrease more slowly during the output of the taper portion 604. In the example of FIG. 6, the sound pattern 600 causes the system voltage 410 to fall to a level near the threshold system voltage 412.

Figure 7:
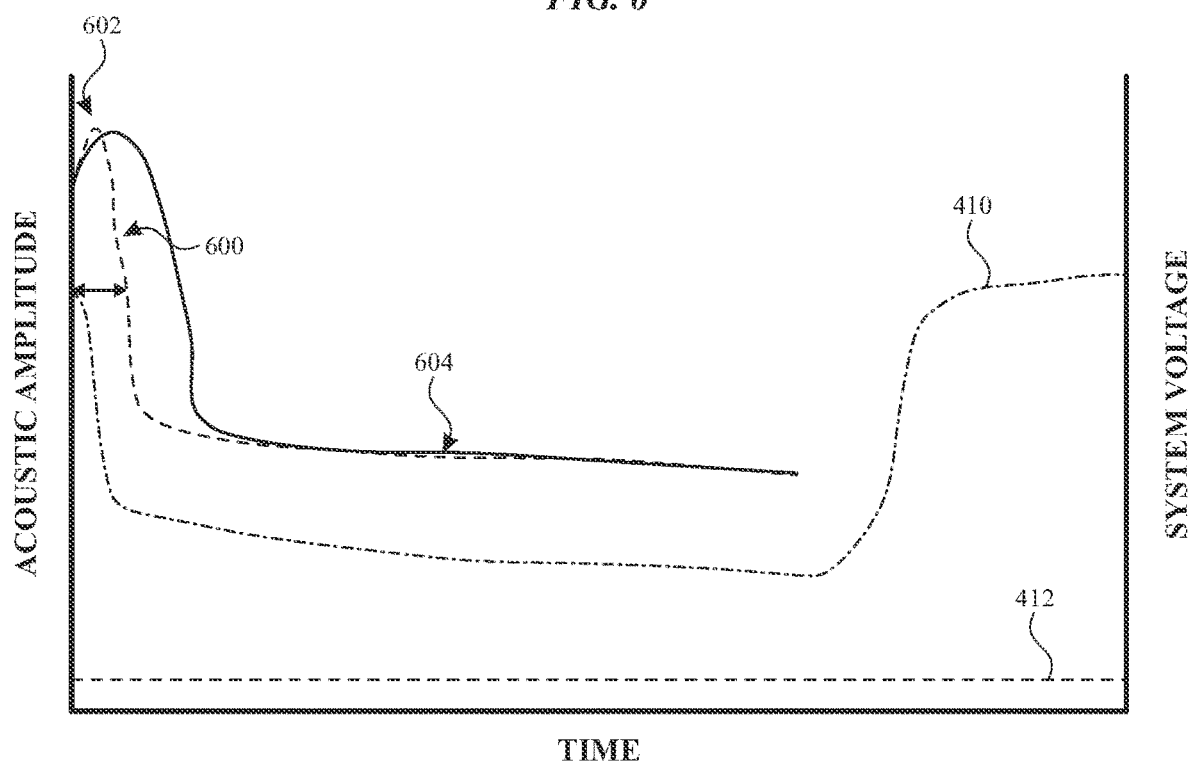
FIG. 7 illustrates another example of audio content that includes a siren sound in accordance with various aspects of the subject technology.
Figure 8:
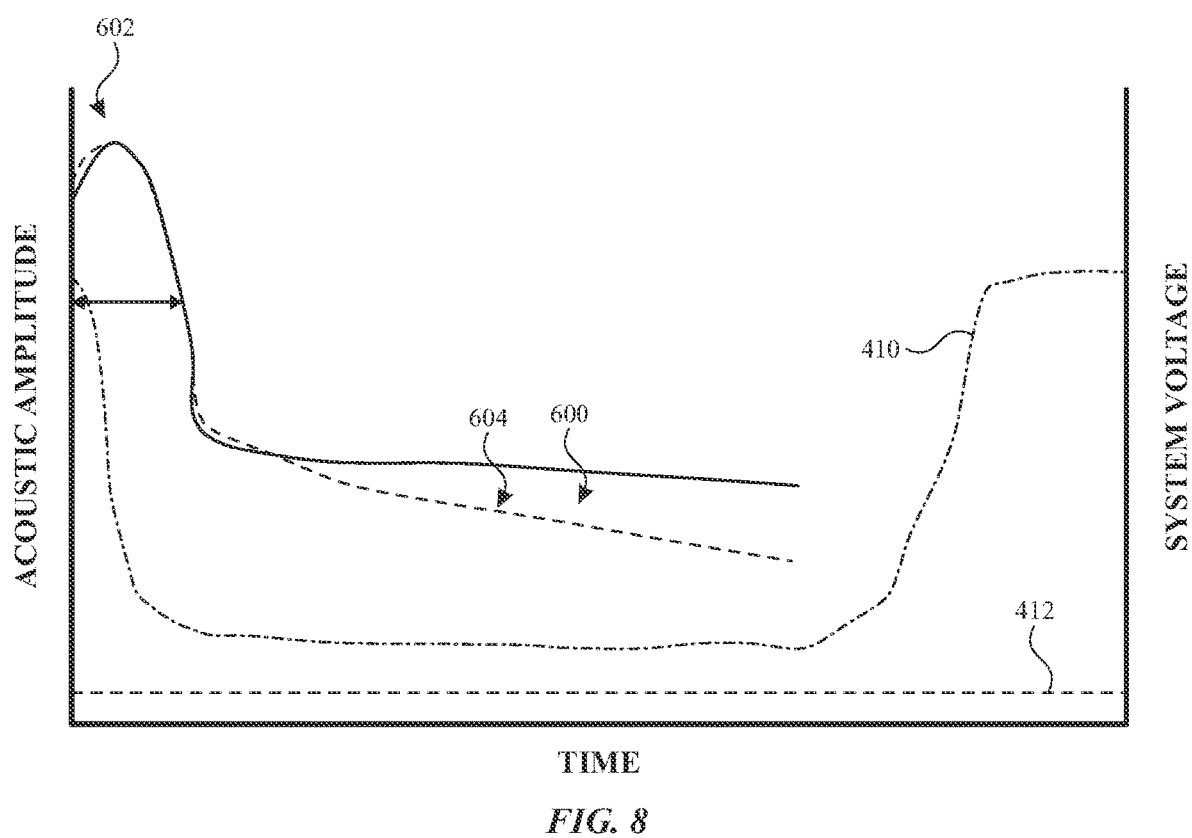
FIG. 8 illustrates yet another example of audio content that includes a siren sound in accordance with various aspects of the subject technology.

FIG. 7 illustrates another example, in which the sound pattern 600 is modified, relative to the sound pattern 600 of FIG. 6, to reduce the impact of the sound pattern 600 on the system voltage 410. As shown in FIG. 7, the width (e.g., in time) of the initial peak 602 may be reduced relative to the width of the initial peak 602 of FIG. 6, without changing the taper portion 604. As shown, reducing the width of the initial peak 602 in this way, reduces the amount by which the system voltage 410 droops during output of the sound pattern 600. FIG. 8 illustrates another example, in which the sound pattern 600 is modified relative to the sound pattern 600 of FIG. 6, to reduce the impact of the sound pattern 600 on the system voltage 410. As shown in FIG. 8, the taper of the taper portion 604 may be increased relative to the taper of the taper portion 604 of FIG. 6, without changing the initial peak 602. As shown, increasing the taper of the taper portion 604 in this way also reduces the amount by which the system voltage 410 droops during output of the sound pattern 600. In various implementations, the modifications of FIG. 6 (e.g., shortening the peak) and FIG. 7 (e.g., increasing the taper) can be used separately or in combination.

In one or more use cases, if the system process 306 determines that the electronic device 100 does not have sufficient power at a given time to output the sound pattern 600 of FIG. 6, the application 300 may output the modified sound pattern of FIG. 7, the modified sound pattern of FIG. 8, the sound pattern 401 of FIG. 4, the sound pattern of FIG. 5, or another sound pattern.

Figure 9:
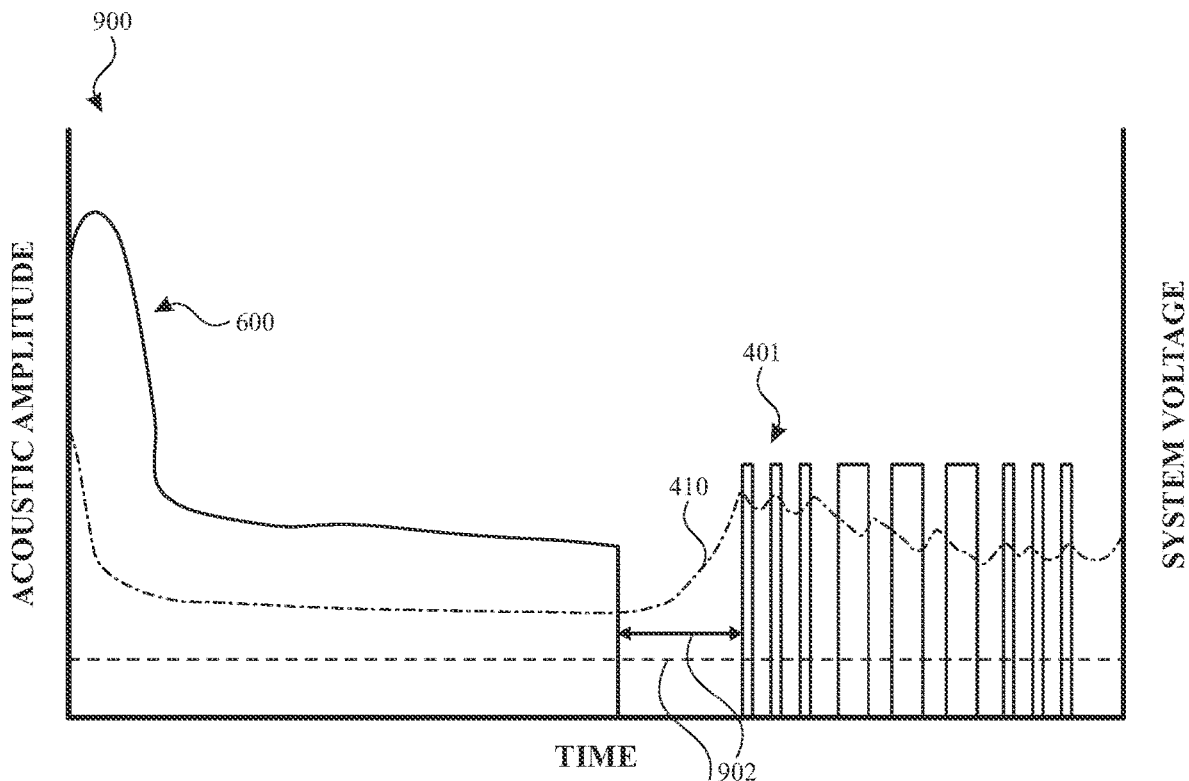
FIG. 9 illustrates an example of a pattern of sounds that can be generated during an audio alert in accordance with various aspects of the subject technology.

FIG. 9 illustrates another example of a sound pattern that may be output by the speaker 114 as part of an audio alert. In the example of FIG. 9, a sound pattern 900 is shown that includes both a sound pattern 600 (a siren sound having an initial peak 602 and a taper portion 604 that follows the initial peak 602) followed by a sound pattern 401 (e.g., a sound pattern that includes a series of chirps, such as coded chirps). As shown in FIG. 9, the sound pattern 401 may be spaced apart (e.g., in time) from the sound pattern 600 by gap 902. As shown, the gap 902 may allow the system voltage 410 to partially recover after output of the sound pattern 600 and prior to output of the sound pattern 401. In one or more implementations, a sound pattern such as the sound pattern 900 may be output by the speaker 114 over the course of several seconds (e.g., between one second and fifteen seconds). In one or more implementations, a sound pattern such as the sound pattern 900 may be repeated for a period of time longer than the output duration of a single repeat (e.g., a period of time of between thirty seconds and several hours).

Figure 10:
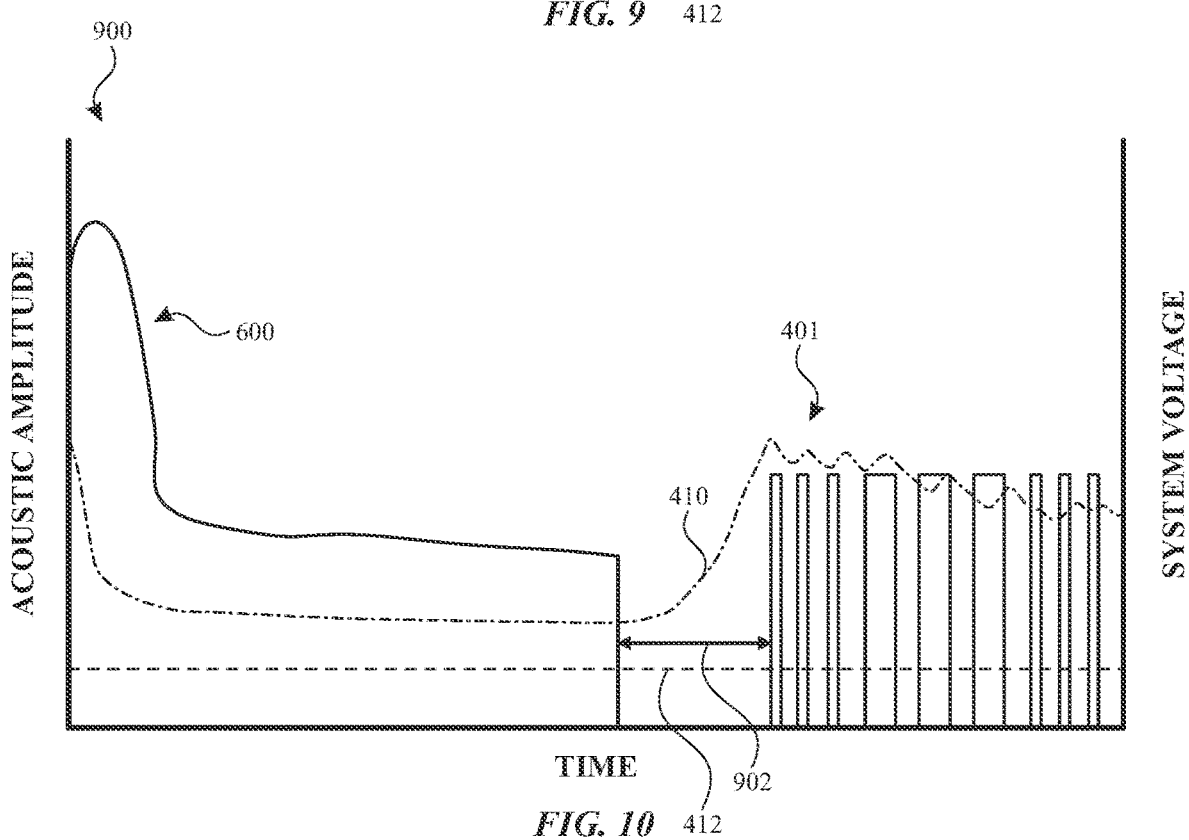
FIG. 10 illustrates an example of a modification of the pattern of sounds of FIG. 9 in accordance with various aspects of the subject technology.

FIG. 10 illustrates another example, in which the sound pattern 900 is modified, relative to the sound pattern 900 of FIG. 9, to increase the gap 902 between the sound pattern 600 and the sound pattern 401. As shown in FIG. 10, the increased gap 902 allows the system voltage 410 to recover further between output of the sound pattern 600 and the output of the sound pattern 401. In this way, the sound pattern 900 can be modified (e.g., by increasing gap 902) such that additional system power is available for other functions of the electronic device 100 and/or for a output of a subsequent sound pattern (e.g., a repeat of the same sound pattern 900 or an output of a different sound pattern). In one or more use cases, if the system process 306 were to determine that the electronic device 100 does not have sufficient power at a given time to output the sound pattern 900 of FIG. 9, the application 300 may output the modified sound pattern of FIG. 10 or another sound pattern. In one or more implementations, any or all of the modifications to the sound pattern 600 and/or the sound pattern 401 (e.g., described in connection with FIGS. 5, 6, and/or 8) can be combined with the modification of FIG. 10.

Figure 11:
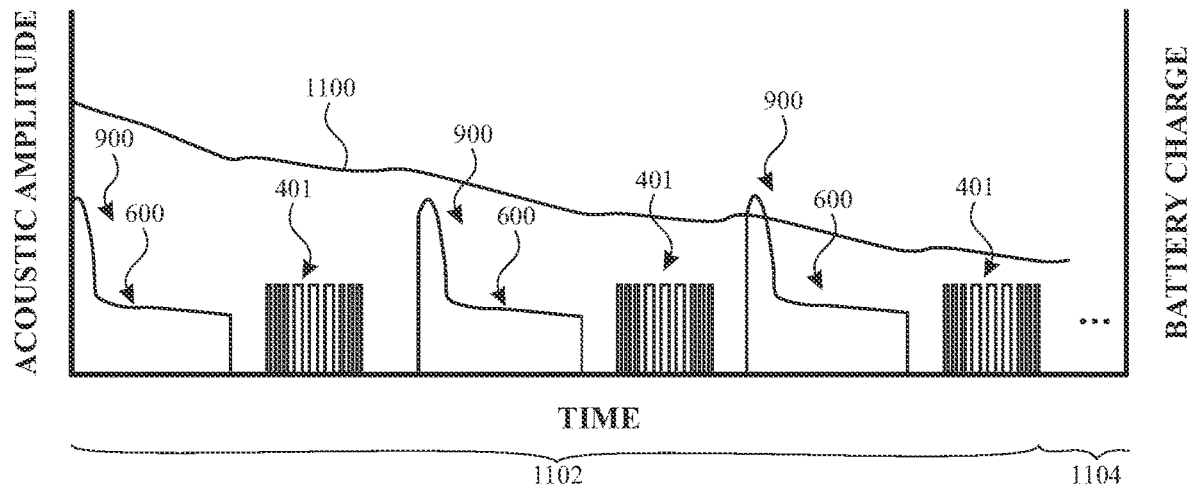
FIG. 11 illustrates an example of a repeating pattern of sounds during an audio alert in accordance with various aspects of the subject technology.

As discussed herein, in one or more implementations, an audio alert may include repeated outputs of one or more sound patterns that continue for an extended period of time (e.g., minutes, hours, or days). For example, FIG. 11 illustrates an example in which the sound pattern 900 is repeated during a period of time 1102 as part of an audio alert by the electronic device 100. FIG. 11 also illustrates how the battery charge 1100 of the battery 224 of the electronic device 100 may decrease, over time, due to the power consumption of the speaker 114 to output the repeating sound pattern 900. It is appreciated that the battery charge 1100 depicted in FIG. 11 is merely illustrative and may be exaggerated relative to the actual decrease of the battery charge of an electronic device in order to highlight the effects of the repeating sound pattern 900 in FIG. 11. In the example, of FIG. 11, the period of time 1102 during which the sound pattern 900 is repeated may be followed by period of time 1104 during which a relatively lower power sound pattern may be repeated (e.g., in order to slow the reduction in the battery charge 1100 and thereby extend the amount of time during which the audio alert can continue).

Figure 12:
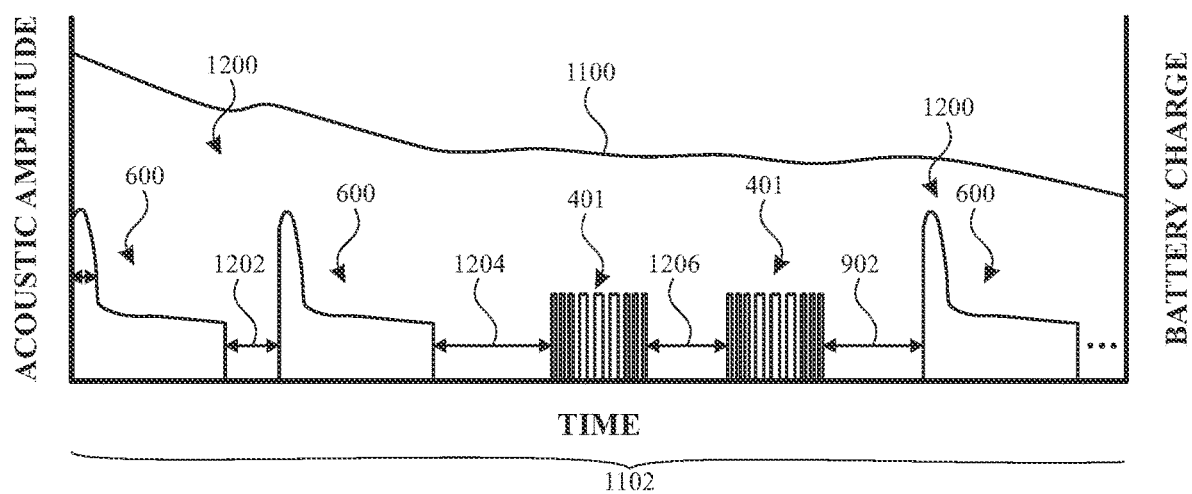
FIG. 12 illustrates another example of a repeating pattern of sounds during an audio alert in accordance with various aspects of the subject technology.

FIG. 12 illustrates a different pattern of sounds that may be (e.g., repeatedly) output by the electronic device 100 during the period of time 1102. For example, the sound pattern 900 of FIG. 11 may include the sound pattern 600 and the sound pattern 401, and the sound pattern 1200 may include two sound patterns 600 followed by two sound patterns 401. FIG. 12 also illustrates how spacings 1202 may be provided between the sound patterns 600, a spacing 1204 may be provided between the sound pattern 600 and the sound pattern 401 within a sound pattern 1200, a spacing 1206 may be provided between the sound patterns 401, as well as the gap 902 between the repeats of the sound patterns 1200. Any or all of the spacings 1202, the spacing 1204, the spacing 1206, and the gap 902 can be increased to slow the reduction in the battery charge 1100 over time.

Figure 13:
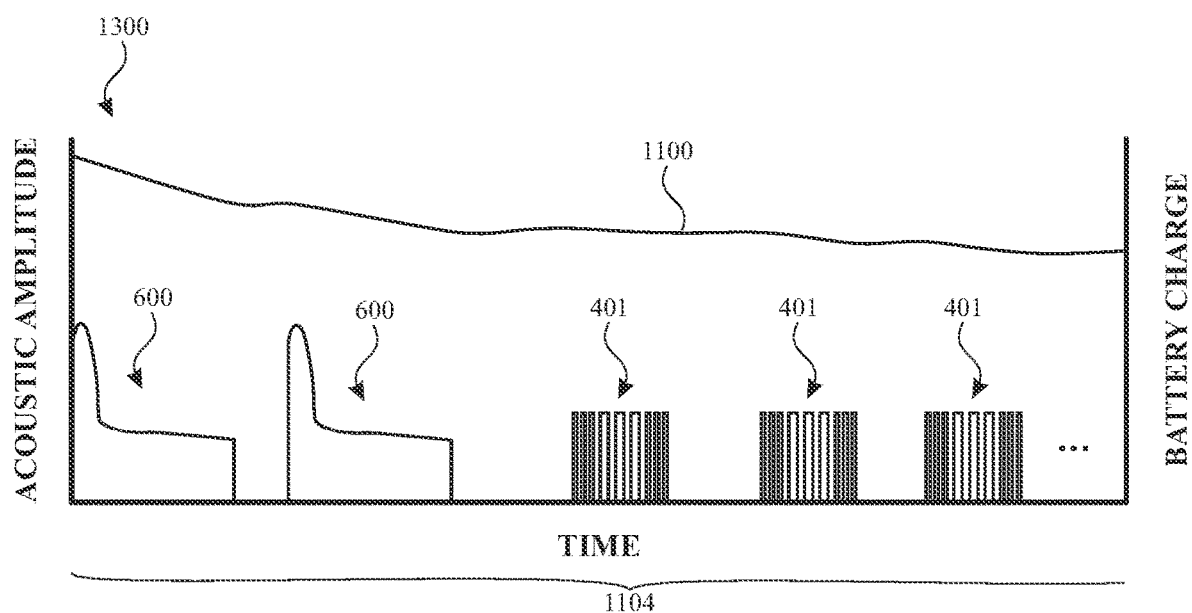
FIG. 13 illustrates another example of a repeating pattern of sounds that may be generated after generating the repeating pattern of sounds of FIG. 12 during an audio alert in accordance with various aspects of the subject technology.

As shown in FIG. 13, a different pattern of sounds may be (e.g., repeatedly) output by the electronic device 100 during the period of time 1104 that follows the period of time 1102. For example, a sound pattern 1300 may be (e.g., repeatedly) output during the period of time 1104. For example, the sound pattern 1300 may include two sound patterns 600 followed by three sound patterns 401. By increasing the number of sound patterns 401 that are output between the sound patterns 600, the number of sound patterns 600 (e.g., which may consume more power to output than the sound patterns 401) that are output over time can be reduced. In this example, repeatedly outputting the sound pattern 1300 may consume, over time, less power than outputting the sound pattern 900 or the sound pattern 1200 (e.g., may reduce the battery charge 1100 by less than repeatedly outputting the sound pattern 900 or the sound pattern 1200). By repeatedly outputting the sound pattern 1300 during the period of time 1104, the battery life of the battery 224 of the electronic device 100 can be extended (e.g., thereby extending the amount of time during which the audio alert can continue to be output by the electronic device). In one or more implementations, the period of time 1104 may be longer than the period of time 1102. In this way, an initial, higher-power audio alert can be followed by an extended, lower-power audio alert.

In one or more implementations, the period of time 1102 and the period of time 1104 may each have a predetermined minimum and a predetermined maximum. For example, the sound pattern 1200 may be repeated by an electronic device for at least the predetermined minimum amount of time for the period of time 1102 and switched to the sound pattern 1300 after, at most, the predetermined maximum amount of time for the period of time 1102. As examples, the predetermined minimum amount of time for the period of time 1102 may be between thirty seconds and one, two, three, four, or five minutes. As examples, the predetermined maximum amount of time for the period of time 1102 may be between thirty minutes and one or two hours. As examples, the predetermined minimum amount of time for the period of time 1104 may be between one minute and two, three, four, five, ten, or fifteen minutes. As examples, the predetermined maximum amount of time for the period of time 1104 may be between one hour and several (e.g., two, three, four, five) hours.

In one or more use cases, a switch from the sound pattern 1200 to the sound pattern 1300 may be made after the predetermined minimum amount of time for the period of time 1102 and before the predetermined maximum amount of time for the period of time 1102, such as responsive to a switch trigger. For example, a switch trigger may be a power-based trigger and/or a temperature-based trigger. For example, a power-based trigger may occur when the battery charge 1100 drops below a battery threshold. As examples, the battery threshold that triggers a switch from the sound pattern 1200 to the sound pattern 1300 may be a fifty percent charge threshold, a forty percent charge threshold, a thirty percent charge, a twenty percent charge, or the like. For example, a temperature-based trigger may occur when a temperature of the electronic device 100 (e.g., as measured by a thermistor or other temperature sensor of the electronic device that measures a temperature of the electronic device, such as at a location separate from the location of the speaker, such as at or near a location of a processor, such as a CPU of the electronic device) rises above a high temperature threshold or falls below a low temperature threshold. For example, the high temperature threshold above which triggers a switch from the sound pattern 1200 to the sound pattern 1300 may be a temperature of thirty seven degrees Celsius, thirty eight degrees Celsius, forty degrees Celsius, or the like. For example, the low temperature threshold below which triggers a switch from the sound pattern 1200 to the sound pattern 1300 may be a temperature of zero seven degrees Celsius, negative five degrees Celsius, negative ten degrees Celsius, negative fifteen degrees Celsius, negative twenty degrees Celsius, or the like. In one or more implementations, the electronic device may provide, separately from power-based triggering and/or device-temperature-based triggering of a switch between sound patterns, open-loop thermal protection of a voice coil speaker, to prevent over-heating of the voice coil.

Figure 14:
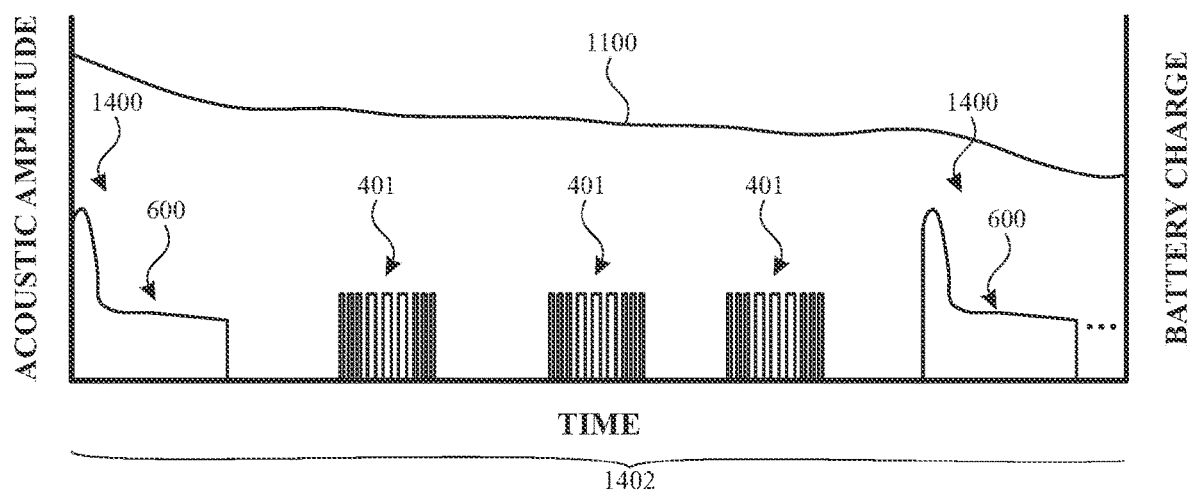
FIG. 14 illustrates another example of a repeating pattern of sounds that may be generated after generating the repeating pattern of sounds of FIG. 13 during an audio alert in accordance with various aspects of the subject technology.

As shown in FIG. 14, yet another different pattern of sounds may be output by the electronic device 100 during a period of time 1402 that follows the period of time 1104. For example, a sound pattern 1400 may be (e.g., repeatedly) output during the period of time 1402. For example, the sound pattern 1400 may include a single sound pattern 600 followed by three sound patterns 401. In this way, the number of sound patterns 600 (e.g., which may consume more power to output than the sound patterns 401) that are output over time can be further reduced. In this example, repeatedly outputting the sound pattern 1400 may consume, over time, less power than outputting the sound pattern 900, the sound pattern 1200, or the sound pattern 1300 (e.g., may reduce the battery charge 1100 by less than repeatedly outputting the sound pattern 900, the sound pattern 1200, or the sound pattern 1300). By repeatedly outputting the sound pattern 1400 during the period of time 1402, the battery life of the battery 224 of the electronic device 100 can be extended (e.g., thereby extending the amount of time during which the audio alert can continue to be output by the electronic device). In one or more implementations, the period of time 1402 may be longer than the period of time 1104. In this way, an initial, higher-power audio alert can be followed by an extended, lower-power audio alert.

In one or more implementations, the period of time 1402 may not have a predetermined minimum or a predetermined maximum. For example, the sound pattern 1400 may be repeated by an electronic device for as long as battery power remains or until the electronic device enters a thermal trap at a maximum device operating temperature. In one or more implementations, a switch from the sound pattern 1300 to the sound pattern 1400 may be made after the predetermined minimum amount of time for the period of time 1104 and before the predetermined maximum amount of time for the period of time 1104, such as responsive to a switch trigger such as a power-based trigger and/or a (e.g., low or high) temperature-based trigger. As examples, a battery threshold that triggers a switch from the sound pattern 1300 to the sound pattern 1400 may be an eighteen percent battery threshold, a fifteen percent battery threshold, a ten percent battery threshold, or the like. As examples, a high temperature threshold above which triggers a switch from the sound pattern 1300 to the sound pattern 1400 may be a temperature of forty degrees Celsius, forty-five degrees Celsius, fifty degrees Celsius, or the like. For example, the low temperature threshold below which triggers a switch from the sound pattern 1200 to the sound pattern 1300 may be a temperature of zero seven degrees Celsius, negative five degrees Celsius, negative ten degrees Celsius, negative fifteen degrees Celsius, negative twenty degrees Celsius, negative twenty five degrees Celsius, or the like.

In one or more implementations, a haptic output (e.g., a coded haptic output, such as a Morse code haptic S.O.S., or any other haptic output) may be provided by the electronic device 100 (e.g., by a haptic component 227 of the electronic device 100) when an audio alert is active and when a user interface of an application (e.g., application 300) for the audio alert is not displayed (e.g., due to the user's wrist being down or the user navigating away from the user interface). In one or more implementations, the haptic output may provide a notification of the active audio alert for users that are unable to hear the audio alert itself.

As illustrated by FIGS. 11-14, an electronic device, such as the electronic device 100, may be provided with multiple power tiers or power rungs for an audio alert, in which each power tier or rung has an associated sound pattern, and in which the tiers or rungs progressively use less power over time.

Figure 15:
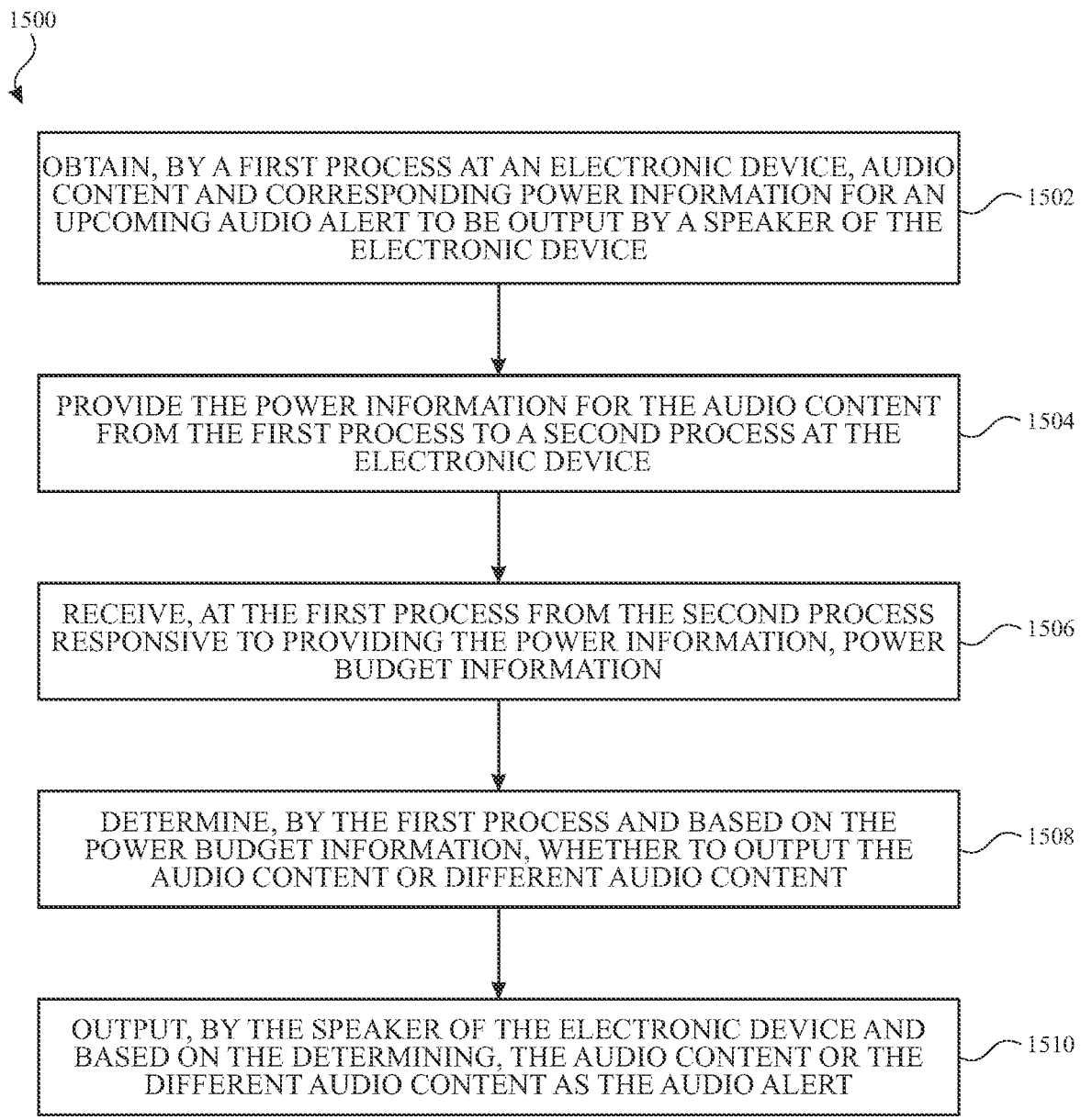
FIG. 15 illustrates a flow chart of illustrative operations that may be performed for providing instantaneous power management for audio alerts in accordance with various aspects of the subject technology.

FIG. 15 illustrates a flow diagram of an example process for providing instantaneous power management for audio alerts, in accordance with one or more implementations. For explanatory purposes, the process 1500 is primarily described herein with reference to the electronic device 100 of FIGS. 1-3. However, the process 1500 is not limited to the electronic device 100 of FIGS. 1-3, and one or more blocks (or operations) of the process 1500 may be performed by one or more other components and other suitable devices. Further for explanatory purposes, the blocks of the process 1500 are described herein as occurring in serial, or linearly. However, multiple blocks of the process 1500 may occur in parallel. In addition, the blocks of the process 1500 need not be performed in the order shown and/or one or more blocks of the process 1500 need not be performed and/or can be replaced by other operations.

In the example of FIG. 15, at block 1502, a first process (e.g., application 300) at an electronic device (e.g., electronic device 100) may obtain audio content (e.g., one or more sound patterns) and corresponding power information for an upcoming audio alert to be output by a speaker (e.g., speaker 114) of the electronic device. The power information may be a power profile, which may indicate an amount of power that would be consumed by operating one or more speakers of the electronic device to output the obtained audio content. As examples, obtaining the audio content may include generating the audio content by a first process (e.g., an application) at the electronic device, obtaining the audio content from memory at the electronic device, and/or obtaining an index or other identifier of the audio content from the memory at the electronic device. Obtaining the corresponding power information may include obtaining previously stored power information for the audio content from memory (e.g., memory 302) of the electronic device.

At block 1504, the power information for the audio content may be provided from the first process to a second process (e.g., system process 306, such as a power manager) at the electronic device. For example, the first process may include an application process and the second process may include a system-level process. For example, the power information may be provided from the first process to the second process via an inter-process communication (IPC).

At block 1506, the first process may receive, from the second process responsive to providing the power information, power budget information. For example, the power budget information may include an approval or a disapproval of the audio content, based on the power information and based on current power state information for the electronic device. As another example, the power budget information may be an indicator of whether sufficient power is available from the system process to meet an amount of power indicated as needed for output of the audio content in the power information from the first process, based on the power information and current power state information for the electronic device. For example, the current power state information may be a power state that is determined, at a current time by the second process, based on the current state of one or more other power consuming resources or components at the electronic device, and/or based on a current charge level and/or voltage level (e.g., a system voltage level) of a battery of the electronic device. For example, if one or more other power consuming components of the electronic device are drawing power from a battery (e.g., battery 224) of the electronic device, the battery voltage provided to the electronic device may be reduced, thereby reducing the amount of power that is currently available for operation of the speaker to output the audio content. In one or more use cases, the power budget information may indicate that the system process may reduce an amplitude (e.g., a loudness) of the audio alert, if the first process attempts to use the audio content for the audio alert.

At block 1508, the first process may determine, based on the power budget information, whether to output the audio content or different audio content. For example, power information for the different audio content may include a different predetermined amount of power to be consumed by the electronic device to output the different audio content. For example, the different predetermined amount of power may be less than the predetermined amount of power for the audio content. In one or more implementations, determining, by the first process and based on the power budget information, whether to output the audio content or different audio content prevents a voltage provided by a power source (e.g., a battery, such as battery 224) for the electronic device from drooping below a threshold (e.g., threshold system voltage 412) while the electronic device (e.g., the speaker 114) is outputting the audio alert.

In one or more implementations, the audio content may include a first predetermined pattern of sounds and the different audio content may include a second, different, predetermined pattern of sounds. For example, in one or more use cases, the audio content may include the sound pattern 600 (e.g., for a siren sound), and the different audio content may include the sound pattern 401 (e.g., for coded series of chirps, such as S.O.S. chirps in Morse code). As another example, in one or more other use cases, the audio content may include the sound pattern 900 or the sound pattern 1200, and the different audio content may include the sound pattern 1300 or the sound pattern 1400.

In one or more other implementations, the different audio content may include a modification of the audio content. For example, the modification of the audio content may include an increase in a gap (e.g., gap 902, spacing 1204, spacing 406, spacing 408, spacing 1202, and/or spacing 1206) between portions of the audio content. As another example, the modification of the audio content may include a decrease in a duration of a peak-intensity portion (e.g., initial peak 602) of the audio content (e.g., as described herein in connection with FIG. 7). As another example, the modification of the audio content may include an increase in a taper of a portion (e.g., taper portion 604) of the audio content (e.g., as described herein in connection with FIG. 8). As another example, the modification of the audio content may include a combination of two or more of an increase in a gap (e.g., gap 902, spacing 1204, spacing 406, spacing 408, spacing 1202, and/or spacing 1206) between portions of the audio content, a decrease in a duration of a peak-intensity portion (e.g., initial peak 602) of the audio content, and an increase in a taper of a portion (e.g., taper portion 604) of the audio content. For example, the taper may of the taper portion may be a taper of as much as or more than 1 decibel (dB). In one or more implementations, the taper may be less than 1 dB to avoid the taper being perceived as the audio source moving away from a listener.

At block 1510, the speaker of the electronic device may be operated to output, based on the determining of whether to output the audio content or the different audio content, the audio content or the different audio content as the audio alert. For example, the speaker may be operated to output the audio content if the power budget information from the second process indicates that there is sufficient instantaneous power available to output the audio content using the speaker, or the speaker may be operated to output the different audio content if the power budget information from the second process indicates that there is insufficient instantaneous power available to output the audio content using the speaker. In one or more implementations, the first process may also provide power information for the different audio content to the second process, and obtain power budget information from the second process, prior to outputting the different audio content (e.g., and may select even lower power audio content if the power budget information received responsive to providing the power information for the different audio content indicates that there is insufficient power for outputting the different audio content).

In the example of FIG. 15, the different audio content may be output in place of the audio content (e.g., without outputting the audio content). In one or more other implementations, the audio content may be output (e.g., and amplitude-attenuated by the system process) even if the power budget information indicates that there is insufficient power to output the audio content, and the different audio content may replace the audio content in a next repeat of the audio content in the audio alert. In one or more implementation, the audio content and/or the different audio content may be output at a highest acoustic amplitude achievable by the speaker and/or the electronic device (e.g., within a predetermined tolerance level of the speaker and/or the circuitry of the electronic device), such as to make the audio alert hearable at a largest possible distance.

Figure 16:
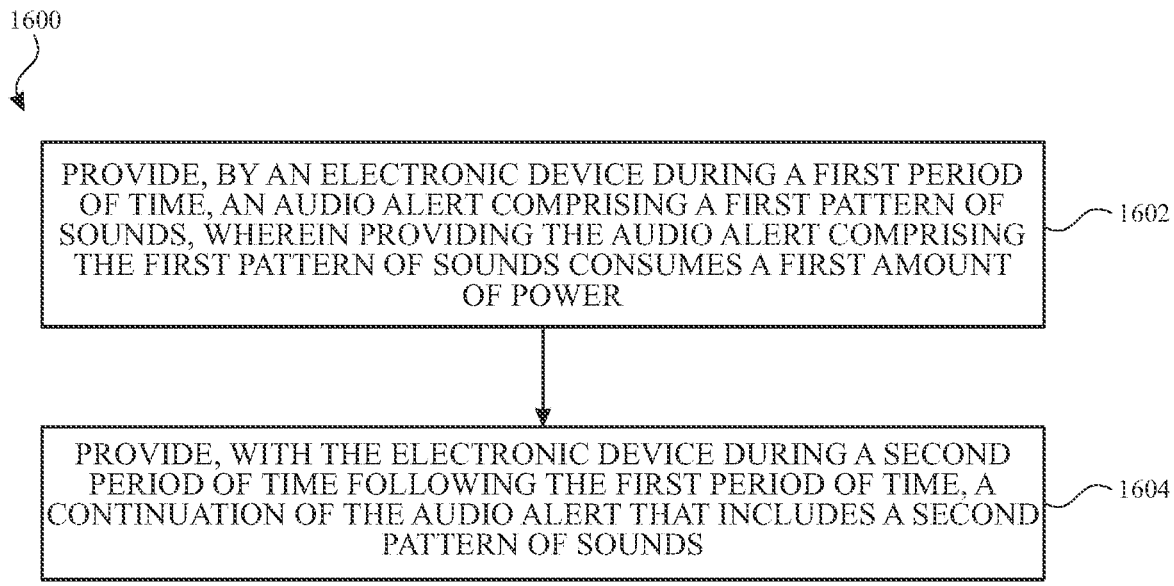
FIG. 16 illustrates a flow chart of illustrative operations that may be performed for providing long-term power management for audio alerts in accordance with various aspects of the subject technology.

FIG. 16 illustrates a flow diagram of an example process for providing long-term power management for audio alerts, in accordance with one or more implementations. For explanatory purposes, the process 1600 is primarily described herein with reference to the electronic device 100 of FIGS. 1-3. However, the process 1600 is not limited to the electronic device 100 of FIGS. 1-3, and one or more blocks (or operations) of the process 1600 may be performed by one or more other components and other suitable devices. Further for explanatory purposes, the blocks of the process 1600 are described herein as occurring in serial, or linearly. However, multiple blocks of the process 1600 may occur in parallel. In addition, the blocks of the process 1600 need not be performed in the order shown and/or one or more blocks of the process 1600 need not be performed and/or can be replaced by other operations.

In the example of FIG. 16, at block 1602, an electronic device (e.g., electronic device 100) may provide, during a first period of time, an audio alert including a first pattern of sounds (e.g., sound pattern 900 or sound pattern 1200). Providing the audio alert including the first pattern of sounds may consume a first amount of power (e.g., at a first power consumption rate, such as per a unit of time, such as per minute or per hour, or per another unit of time longer than the time for outputting the first pattern of sounds). In one illustrative use case, the first pattern of sounds may include a plurality of siren sounds (e.g., each having a sound pattern 600 or other similar continuous sound pattern) and a plurality of coded chirps (e.g., a sound pattern 401) spaced apart, by a gap (e.g., gap 902), from the plurality of siren sounds. In one or more implementations, providing the audio alert may include providing the audio alert responsive to detecting, by the electronic device, an emergency condition (e.g., a fall, a loss of awareness, or other emergency condition) associated with a user of the electronic device.

At block 1604, the electronic device may provide, during a second period of time following the first period of time, a continuation of the audio alert including a second pattern of sounds (e.g., sound pattern 1300). Providing the continuation of the audio alert including the second pattern of sounds may consume a second amount of power less than the first amount of power (e.g., at a second power consumption rate, such as per the same unit of time, such as per minute, per hour, or per another unit of time longer than the time for outputting the first pattern of sounds or the second pattern of sounds). In one or more implementations, the second period of time may be immediately after the first period of time and longer than the first period of time. In one illustrative use case, the second pattern of sounds may include the plurality of siren sounds and an increased plurality of coded chirps spaced apart, by an increased gap, from the plurality of siren sounds (e.g., as illustrated in FIG. 13). The continuation of the audio alert may be an acoustically contiguous continuation of the audio alert. For example, the second pattern of sounds may be provided acoustically contiguously with the first pattern of sounds (e.g., a gap between the end of a last repeat of the first pattern of sounds and the beginning a first repeat of the second pattern of sounds may be substantially similar to (e.g., the same as or within a factor of two of) the spacing between repeats of the first pattern of sounds.

In one or more implementations, the first pattern of sounds may also include a first spacing (e.g., spacing 1202) between the siren sounds of the plurality of siren sounds and the second pattern of sounds may also include a second spacing (e.g., an increased spacing 1202), greater than the first spacing, between the siren sounds of the plurality of siren sounds. In one or more implementations, the first pattern of sounds may also include a third spacing (e.g., spacing 1206) between sets of the plurality of coded chirps and the second pattern of sounds may also include a fourth spacing (e.g., an increased spacing 1206), greater than the third spacing, between the sets of the plurality of coded chirps.

In one or more implementations, the process 1600 may also include providing, with the electronic device during a third period of time following the second period of time, a further continuation of the audio alert including a third pattern of sounds (e.g., sound pattern 1400). For example, providing the further continuation of the audio alert including the third pattern of sounds may consume (e.g., per the same unit of time, such as per minute, per hour, or per another unit of time longer than the time for outputting the first pattern of sounds, the second pattern of sounds, or the third pattern of sounds) a third amount of power less than the second amount of power. For example, the third pattern of sounds may include a single siren sound and the increased plurality of coded chirps, spaced apart from the single siren sound by a further increased gap (e.g., as illustrated in FIG. 14). In one or more implementations, the process 1600 may also include providing, with the electronic device, at least one siren sound (e.g., a pair of siren sounds) prior to the first period of time.

In one or more use cases, providing the continuation of the audio alert including the second pattern of sounds during the second period of time may include providing the continuation of the audio alert including the second pattern of sounds responsive to an expiration of the first period of time (e.g., after a predetermined maximum time for the first period of time). In one or more other use cases, providing the continuation of the audio alert including the second pattern of sounds during the second period of time may include providing the continuation of the audio alert including the second pattern of sounds responsive to determining, after a first predetermined portion of the first period of time (e.g., after a predetermined minimum amount of time for the first period of time, and before a predetermined maximum amount of time for the first period of time), a battery charge (e.g., battery charge 1100) below a threshold for a battery (e.g., battery 224) of the electronic device. In one or more other use cases, providing the continuation of the audio alert including the second pattern of sounds during the second period of time may include providing the continuation of the audio alert including the second pattern of sounds responsive to determining, after a first predetermined portion of the first period of time (e.g., after the predetermined minimum amount of time for the first period of time and before the predetermined maximum amount of time for the first period of time), a device temperature above a threshold for the electronic device.

In one or more implementations, the electronic device may select sound patterns to predictively consume power over time from the start of an audio alert (e.g., based on additional information about the physical environment of the electronic device). For example, if the electronic device is in a highly populated area or another area in which one or more other devices are detected in a proximity to the electronic device, the electronic device may select sound patterns for a first portion of the alert that consume relatively more power (e.g., to allow for the possibility of a relatively short amount of time before the audio alert is heard by another person), or if the electronic device is in a remote area with no other devices detected nearby, the electronic device may select sound patterns for the first portion of the alert that consume relatively less power (e.g., to allow for the possibility of a relatively longer amount of time before the audio alert is heard by another person).

In the examples of FIGS. 15 and 16, aspects of instantaneous and long-term power management for audio alerts are separately described. However, in various implementations, any or all of the features and/or operations of FIG. 15 may be used in conjunction with any or all of the features and/or operations of FIG. 16.

Figure 17:
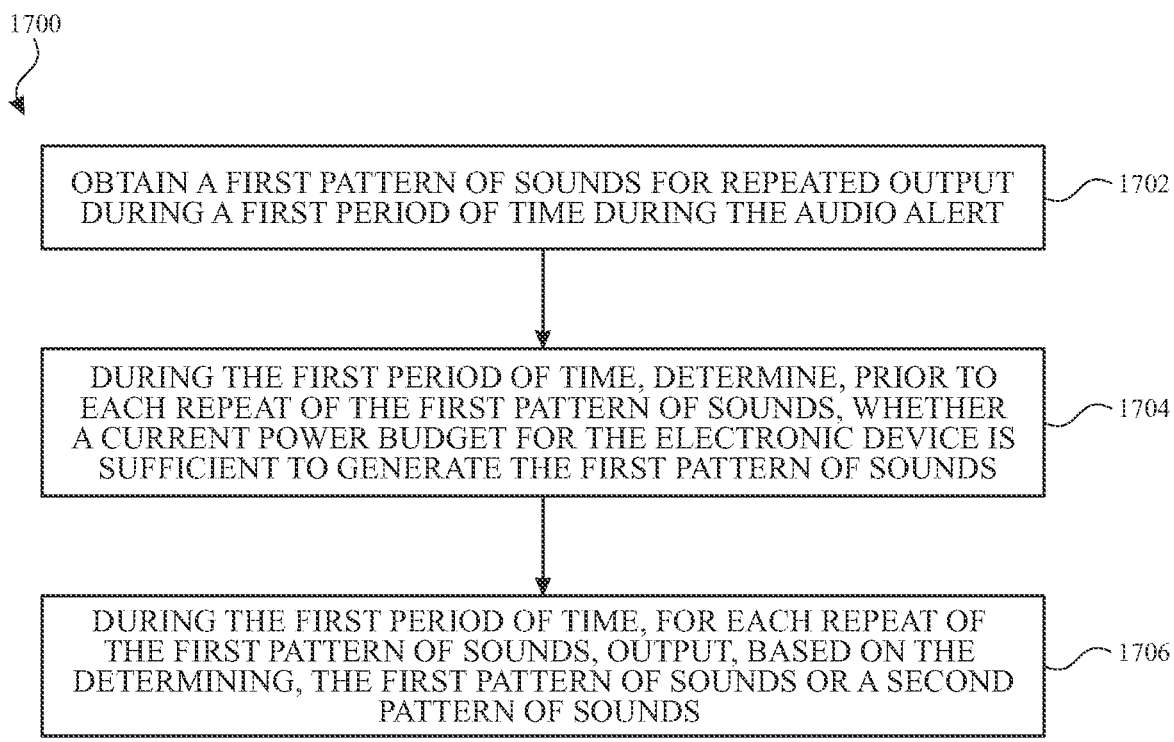
FIG. 17 illustrates a flow chart of illustrative operations that may be performed for providing instantaneous and long-term power management for audio alerts in accordance with various aspects of the subject technology.

As one example, FIG. 17 illustrates a flow diagram of an example process for providing instantaneous and long-term power management for audio alerts, in accordance with one or more implementations. For explanatory purposes, the process 1700 is primarily described herein with reference to the electronic device 100 of FIGS. 1-3. However, the process 1700 is not limited to the electronic device 100 of FIGS. 1-3, and one or more blocks (or operations) of the process 1700 may be performed by one or more other components and other suitable devices. Further for explanatory purposes, the blocks of the process 1700 are described herein as occurring in serial, or linearly. However, multiple blocks of the process 1700 may occur in parallel. In addition, the blocks of the process 1700 need not be performed in the order shown and/or one or more blocks of the process 1700 need not be performed and/or can be replaced by other operations.

In the example of FIG. 17, an electronic device (e.g., electronic device 100) may, at block 1702, obtain a first pattern of sounds (e.g., sound pattern 600, sound pattern 900, or sound pattern 1200) for repeated output during a first period of time (e.g., period of time 1102) during an audio alert. As examples, obtaining the first pattern of sounds may include generating the first pattern of sounds by a first process (e.g., an application) at the electronic device, obtaining the first pattern of sounds from memory at the electronic device, and/or obtaining an index or other identifier of the first pattern of sounds from the memory at the electronic device.

At block 1704, during the first period of time, the electronic device may determine, prior to each repeat of the first pattern of sounds, whether a current power budget for the electronic device is sufficient to generate the first pattern of sounds. For example, determining whether the current power budget for the electronic device is sufficient to generate the first pattern of sounds may include obtaining power information for the first pattern of sounds, providing the power information to a system process at the electronic device, and receiving, responsive to providing the power information, power budget information from the system process (e.g., as described herein in connection with blocks 1504, 1506, and/or 1508 of FIG. 15).

At block 1706, during the first period of time, for each repeat of the first pattern of sounds, the electronic device may output, based on the determination of whether the current power budget for the electronic device is sufficient to generate the first pattern of sounds, the first pattern of sounds or a second pattern of sounds (e.g., sound pattern 401, sound pattern 1300, or sound pattern 1400). For example, the electronic device may output, based on the determination of whether the current power budget for the electronic device is sufficient to generate the first pattern of sounds, the first pattern of sounds or the second pattern of sounds by: outputting the first pattern of sounds with the speaker if the current power budget for the electronic device is sufficient to generate the first pattern of sounds; and outputting a second pattern of sounds in place of the first pattern of sounds (e.g., in a current or next repeat of the first pattern of sounds) if the current power budget of the electronic device is insufficient to generate the first pattern of sounds.

For example, the electronic device may, during the first period of time: for a first repeat of the first pattern of sounds, output the first pattern of sounds with the speaker responsive to determining that the current power budget for the electronic device is sufficient to generate the first pattern of sounds; and for a second repeat of the first pattern of sounds, output a second pattern of sounds in place of the first pattern of sounds responsive to determining that the current power budget of the electronic device is insufficient to generate the first pattern of sounds. In one or more use cases, the electronic device may also, during the first period of time and after outputting the second pattern of sounds in place of the first pattern of sounds: for a third repeat of the first pattern of sounds, output the first pattern of sounds with the speaker responsive to determining that the current power budget for the electronic device is sufficient to generate the first pattern of sounds (e.g., because the current power budget for the electronic device has recovered sufficiently to output the first pattern of sounds).

In one or more implementations, the process 1700 may also include determining, by the electronic device, that, during the first period of time, the first pattern of sounds has been replaced by the second pattern of sounds more than a threshold number of times; and responsive to the determination that the first pattern of sounds has been replaced by the second pattern of sounds more than the threshold number of times, obtain a third pattern of sounds, different from the first pattern of sounds, for repeated output during a second period of time (e.g., period of time 1104) during the audio alert.

In one or more implementations, generating the audio alert may include repeatedly outputting the first pattern of sounds with the speaker during the first period of time; obtaining a third pattern of sounds for repeated output during a second period of time during the audio alert and following the first period of time; and during the second period of time: determining, prior to each repeat of the third pattern of sounds, whether a current power budget for the electronic device is sufficient to generate the third pattern of sounds; and for each repeat of the third pattern of sounds, outputting, based on the determining of whether the current power budget for the electronic device is sufficient to generate the third pattern of sounds, the third pattern of sounds or a fourth pattern of sounds (e.g., a lower power-consuming pattern of sounds than the third pattern of sounds).

In one or more implementations, the repeating of a pattern of sounds, and a progression to repeating lower power consuming patterns of sounds (e.g., as described in connection with FIG. 17) may continue, and/or be carried over, across various changes in a mode or state of an electronic device (e.g., continuing across a powering off and on of the electronic device, across a loss of battery power and recharging of a battery (e.g., battery 224), across a closing of an application for the audio alert, and/or across a user switch to another application at the electronic device), unless a deliberate (e.g., intentional, confirmed) user input to stop the audio alert is received. In one or more implementations, the repeats of the patterns of sounds may be synchronized with a particular time of day. In this way, searchers, such as rescue workers, that may by searching for the user of an electronic device can be trained to listen for the audio alerts at particular times. For example, at least one of the repeats may be output by an electronic device shortly before the end of a minute (e.g., or each minute) on a clock that is maintained and/or displayed by the electronic device (e.g., a world clock or a clock for a particular time zone). In this way, the audio alerts may avoid overlapping with alarms or other notifications that are output by the electronic device and/or other electronic devices at the beginning of a particular minute.

In various implementations, an electronic device, such as the electronic device 100, that outputs an audio alert may (e.g., in addition to or in place of some or all of the operations described in connection with FIGS. 15-17) also modify the operation of one or more other components and/or processes of the electronic device when an audio alert is being generated. As one example, the electronic device

100 may disable an always-on display function of a display of the electronic device 100 when the audio alert is active.

In one or more use cases, an audio alert may be an emergency alert, which may be generated when a user or wearer of the electronic device is in a stressed, altered, or even unconscious state. Accordingly, in one or more implementations, turning off or disabling an active audio alert may include a multi-step confirmation process (e.g., to help confirm that a user input to turn off or disable the audio alert is an intentional user input). However, because an audio alert may be desirable or needed in many foreseeable and/or unforeseeable emergency and/or non-emergency situations, the electronic device 100 may be configured to allow some level of user choice in operating the electronic device during an audio alert (e.g., in contrast with disabling all other device functions).

As one example, the electronic device 100 may allow user-initiated functions that use audio for relatively short periods of time (e.g., a voice-based user input function, a voice-over output function, a previously scheduled alarm, or a telephone call or other communication to another device) to temporarily override an audio alert. The electronic device may prevent, during an audio alert, longer running audio functions, such as output of a podcast, a song, or other entertainment content. For example, the electronic device 100 may output a previously scheduled alarm for a duration, such as between five seconds and fifty seconds, and then return to outputting the audio alert. The electronic device may store and/or display (e.g., at a later time, after the audio alert has ceased) a notification that the alarm was disabled.

As another example, the electronic device 100 may allow a user to navigate from an application for providing the audio alert to another application at the electronic device 100 during an audio alert. In one or more implementations, the electronic device 100 may display a persistent selectable indicator (e.g., an icon or a complication) of the audio alert on all screens as the user navigates, to allow the user to easily return to the audio alert application.

As another example, the electronic device 100 may reduce an amplitude (e.g., loudness, such as by 4-6 dB) of an audio alert when a display (e.g., display 110) of the electronic device 100 is active, and/or increase the amplitude of the audio alert when the display is inactive. For example, in an implementation in which the electronic device 100 is implemented as a smart watch, the display may be activated when a user/wearer of the electronic device raises their wrist to view the display. This wrist raise may also reduce (e.g., by as much as or more than half) the distance between the electronic device 100 and the ears of the user, which will also cause the loudness of the audio alert, as perceived by the user/wearer to increase if the loudness is not adjusted. In one or more implementations, the electronic device 100 may provide a "snooze" feature in which a user of the electronic device can disable the output of the audio alert for a period of time with a simple input or gesture, without closing the user interface of the application for the audio alert (e.g., to allow the user to easily resume the audio alert).

In some electronic devices that are implemented as wearable electronic devices, the functionality of the electronic device may be disabled when the device is not worn (e.g., when a smart watch is off wrist). In one or more implementations, the electronic device 100 may allow the audio alert to be activated and output even when not worn by a user (e.g., to allow the electronic device outputting the audio alert to be placed in a location with better or more consistent acoustic access to the environment and/or if a smart watch is dislodged from the wrist of the user as a result of a fall or other accident). In one or more implementations, activating or continuing an audio alert while a wearable electronic device is not worn can cause the electronic device to select relatively lower power consuming audio content (e.g., sound patterns) for the audio alert than would be selected if the electronic device were being worn (e.g., to reduce heat generation by the electronic device to account for the removal of the user's body as a heat sink for thermal control of the electronic device). In one or more implementations, the electronic device 100 may select relatively higher power consuming audio content (e.g., sound patterns) for the audio alert if a particular environmental temperature range is detected by the electronic device (e.g., if the electronic device is exposed to sunlight or another warm environment that warms the battery of the electronic device and thereby reduces the voltage droop caused by the output of the audio alert).

Although various examples are described herein in which power management, including instantaneous and/or long-term power management, is provided for an electronic device outputting audio alerts (e.g., emergency alerts), it is also appreciated that the power management operations described herein can also be applied to other audio outputs and/or other speaker operations. For example, in one or more implementations, the power management operates described herein in connection with any or all of FIGS. 3-17 can be applied to tones (e.g., ejection tones) generated by a speaker for ejecting an occluding substance blocking the speaker, such as water or other liquid that has entered, for example, a front volume of the speaker. In some use cases, a liquid, such as water, occludes a speaker, and the speaker can be operated to generate a pattern of ejection tones for liquid ejection. In one illustrative example, an electronic device having an occluded speaker can generate a number (e.g., five, ten, or twenty) repeats of a tone at a particular frequency (e.g., 196 Hz, or another frequency) to attempt to eject an occluding material. In one or more implementations of the subject technology, repeats of the number of ejection tones can be dynamically modified based on, for example, a predicted instantaneous voltage droop that would be caused by outputting the pattern of ejection tones, and/or an overall power drain that would be caused by outputting the pattern of ejection tones. As examples, the number of ejection tones may be reduced and/or further spaced apart to reduce the instantaneous power consumption of outputting the ejection tones, the length of a particular ejection tone can be reduced or tapered to reduce the instantaneous power consumption of outputting the ejection tones, and/or the pattern of ejection tones may be otherwise modified and/or spaced apart to reduce or maintain the long-term power consumption of outputting the ejection tones.

As described above, one aspect of the present technology is the gathering and use of data available from specific and legitimate sources for providing user information in association with processing audio and/or non-audio signals. The present disclosure contemplates that in some instances, this gathered data may include personal information data that uniquely identifies or can be used to identify a specific person. Such personal information data can include demographic data, location-based data, online identifiers, telephone numbers, email addresses, home addresses, data or records relating to a user's health or level of fitness (e.g., vital signs measurements, medication information, exercise information), date of birth, or any other personal information.

The present disclosure recognizes that the use of such personal information data, in the present technology, can be used to the benefit of users. For example, the personal information data can be used for detecting an emergency condition and/or generating an audio alert. Accordingly, use of such personal information data may facilitate transactions (e.g., online transactions). Further, other uses for personal information data that benefit the user are also contemplated by the present disclosure. For instance, health and fitness data may be used, in accordance with the user's preferences to provide insights into their general wellness, or may be used as positive feedback to individuals using technology to pursue wellness goals.

The present disclosure contemplates that those entities responsible for the collection, analysis, disclosure, transfer, storage, or other use of such personal information data will comply with well-established privacy policies and/or privacy practices. In particular, such entities would be expected to implement and consistently apply privacy practices that are generally recognized as meeting or exceeding industry or governmental requirements for maintaining the privacy of users. Such information regarding the use of personal data should be prominently and easily accessible by users, and should be updated as the collection and/or use of data changes. Personal information from users should be collected for legitimate uses only. Further, such collection/sharing should occur only after receiving the consent of the users or other legitimate basis specified in applicable law. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations which may serve to impose a higher standard. For instance, in the US, collection of or access to certain health data may be governed by federal and/or state laws, such as the Health Insurance Portability and Accountability Act (HIPAA); whereas health data in other countries may be subject to other regulations and policies and should be handled accordingly.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, in the case of detecting an emergency condition and/or generating an audio alert, the present technology can be configured to allow users to select to "opt in" or "opt out" of participation in the collection of personal information data during registration for services or anytime thereafter. In addition to providing "opt in" and "opt out" options, the present disclosure contemplates providing notifications relating to the access or use of personal information. For instance, a user may be notified upon downloading an app that their personal information data will be accessed and then reminded again just before personal information data is accessed by the app.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing identifiers, controlling the amount or specificity of data stored (e.g., collecting location data at city level rather than at an address level), controlling how data is stored (e.g., aggregating data across users), and/or other methods such as differential privacy.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data.

Figure 18:
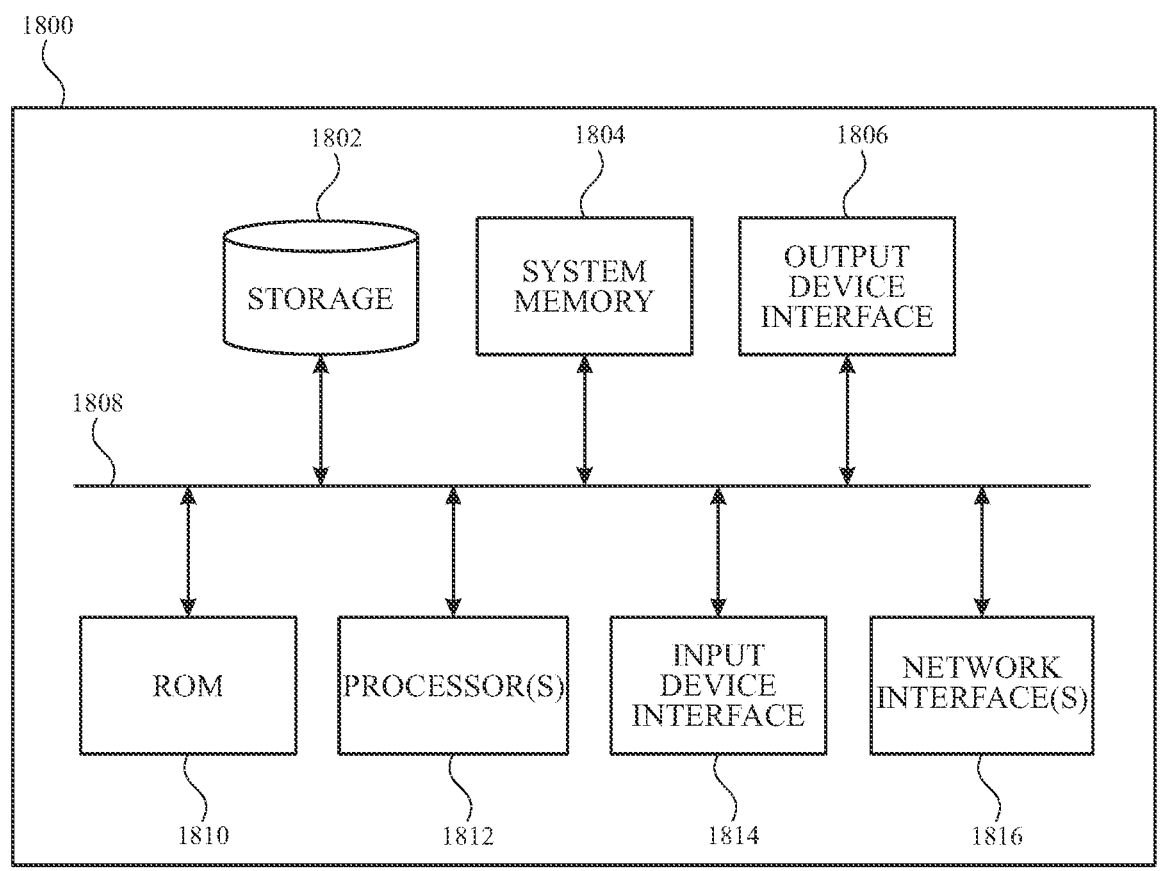
FIG. 18 illustrates an electronic system with which one or more implementations of the subject technology may be implemented.

FIG. 18 illustrates an electronic system 1800 with which one or more implementations of the subject technology may be implemented. The electronic system 1800 can be, and/or can be a part of, one or more of the electronic device 100 shown in FIG. 1. The electronic system 1800 may include various types of computer readable media and interfaces for various other types of computer readable media. The electronic system 1800 includes a bus 1808, one or more processing unit(s) 1812, a system memory 1804 (and/or buffer), a ROM 1810, a permanent storage device 1802, an input device interface 1814, an output device interface 1806, and one or more network interfaces 1816, or subsets and variations thereof.

The bus 1808 collectively represents all system, peripheral, and chipset buses that communicatively connect the numerous internal devices of the electronic system 1800. In one or more implementations, the bus 1808 communicatively connects the one or more processing unit(s) 1812 with the ROM 1810, the system memory 1804, and the permanent storage device 1802. From these various memory units, the one or more processing unit(s) 1812 retrieves instructions to execute and data to process in order to execute the processes of the subject disclosure. The one or more processing unit(s) 1812 can be a single processor or a multi-core processor in different implementations.

The ROM 1810 stores static data and instructions that are needed by the one or more processing unit(s) 1812 and other modules of the electronic system 1800. The permanent storage device 1802, on the other hand, may be a read-and-write memory device. The permanent storage device 1802 may be a non-volatile memory unit that stores instructions and data even when the electronic system 1800 is off. In one or more implementations, a mass-storage device (such as a magnetic or optical disk and its corresponding disk drive) may be used as the permanent storage device 1802.

In one or more implementations, a removable storage device (such as a floppy disk, flash drive, and its corresponding disk drive) may be used as the permanent storage device 1802. Like the permanent storage device 1802, the system memory 1804 may be a read-and-write memory device. However, unlike the permanent storage device 1802, the system memory 1804 may be a volatile read-and-write memory, such as random access memory. The system memory 1804 may store any of the instructions and data that one or more processing unit(s) 1812 may need at runtime. In one or more implementations, the processes of the subject disclosure are stored in the system memory 1804, the permanent storage device 1802, and/or the ROM 1810. From these various memory units, the one or more processing unit(s) 1812 retrieves instructions to execute and data to process in order to execute the processes of one or more implementations.

The bus 1808 also connects to the input and output device interfaces 1814 and 1806. The input device interface 1814 enables a user to communicate information and select commands to the electronic system 1800. Input devices that may be used with the input device interface 1814 may include, for example, microphones, alphanumeric keyboards and pointing devices (also called "cursor control devices"). The output device interface 1806 may enable, for example, the display of images generated by electronic system 1800. Output devices that may be used with the output device interface 1806 may include, for example, printers and display devices, such as a liquid crystal display (LCD), a light emitting diode (LED) display, an organic light emitting diode (OLED) display, a flexible display, a flat panel display, a solid state display, a projector, a speaker or speaker module, or any other device for outputting information. One or more implementations may include devices that function as both input and output devices, such as a touchscreen. In these implementations, feedback provided to the user can be any form of sensory feedback, such as visual feedback, auditory feedback, or tactile feedback; and input from the user can be received in any form, including acoustic, speech, or tactile input.

Finally, as shown in FIG. 18, the bus 1808 also couples the electronic system 1800 to one or more networks and/or to one or more network nodes through the one or more network interface(s) 1816. In this manner, the electronic system 1800 can be a part of a network of computers (such as a LAN, a wide area network ("WAN"), or an Intranet, or a network of networks, such as the Internet. Any or all components of the electronic system 1800 can be used in conjunction with the subject disclosure.

In accordance with some aspects of the subject disclosure, a method is provided that includes obtaining, by a first process at an electronic device, audio content and corresponding power information for an upcoming audio alert to be output by a speaker of electronic device; providing the power information for the audio content from the first process to a second process at the electronic device; receiving, at the first process from the second process responsive to providing the power information, power budget information; determining, by the first process and based on the power budget information, whether to output the audio content or different audio content; and outputting, by the speaker of the electronic device and based on the determining, the audio content or the different audio content as the audio alert.

In accordance with some aspects of the subject disclosure, a method is provided that includes providing, by an electronic device during a first period of time, an audio alert including a first pattern of sounds, wherein providing the audio alert including the first pattern of sounds consumes a first amount of power; and providing, with the electronic device during a second period of time following the first period of time, a continuation of the audio alert including a second pattern of sounds, wherein providing the continuation of the audio alert including the second pattern of sounds consumes a second amount of power less than the first amount of power.

In accordance with other aspects of the subject disclosure, an electronic device is provided that includes a speaker; and one or more processors configured to: obtain a first pattern of sounds for repeated output during a first period of time during the audio alert; and during the first period of time: determine, prior to each repeat of the first pattern of sounds whether a current power budget for the electronic device is sufficient to generate the first pattern of sounds; and for each repeat of the first pattern of sounds, output, based on the determination of whether the current power budget for the electronic device is sufficient to generate the first pattern of sounds, the first pattern of sounds or a second pattern of sounds.

Implementations within the scope of the present disclosure can be partially or entirely realized using a tangible computer-readable storage medium (or multiple tangible computer-readable storage media of one or more types) encoding one or more instructions. The tangible computer-readable storage medium also can be non-transitory in nature.

The computer-readable storage medium can be any storage medium that can be read, written, or otherwise accessed by a general purpose or special purpose computing device, including any processing electronics and/or processing circuitry capable of executing instructions. For example, without limitation, the computer-readable medium can include any volatile semiconductor memory, such as RAM, DRAM, SRAM, T-RAM, Z-RAM, and TTRAM. The computer-readable medium also can include any non-volatile semiconductor memory, such as ROM, PROM, EPROM, EEPROM, NVRAM, flash, nvSRAM, FeRAM, FeTRAM, MRAM, PRAM, CBRAM, SONOS, RRAM, NRAM, racetrack memory, FJG, and Millipede memory.

Further, the computer-readable storage medium can include any non-semiconductor memory, such as optical disk storage, magnetic disk storage, magnetic tape, other magnetic storage devices, or any other medium capable of storing one or more instructions. In one or more implementations, the tangible computer-readable storage medium can be directly coupled to a computing device, while in other implementations, the tangible computer-readable storage medium can be indirectly coupled to a computing device, e.g., via one or more wired connections, one or more wireless connections, or any combination thereof.

Instructions can be directly executable or can be used to develop executable instructions. For example, instructions can be realized as executable or non-executable machine code or as instructions in a high-level language that can be compiled to produce executable or non-executable machine code. Further, instructions also can be realized as or can include data. Computer-executable instructions also can be organized in any format, including routines, subroutines, programs, data structures, objects, modules, applications, applets, functions, etc. As recognized by those of skill in the art, details including, but not limited to, the number, structure, sequence, and organization of instructions can vary significantly without varying the underlying logic, function, processing, and output.

While the above discussion primarily refers to microprocessor or multi-core processors that execute software, one or more implementations are performed by one or more integrated circuits, such as ASICs or FPGAs. In one or more implementations, such integrated circuits execute instructions that are stored on the circuit itself.

Various functions described above can be implemented in digital electronic circuitry, in computer software, firmware or hardware. The techniques can be implemented using one or more computer program products. Programmable processors and computers can be included in or packaged as mobile devices. The processes and logic flows can be performed by one or more programmable processors and by one or more programmable logic circuitry. General and special purpose computing devices and storage devices can be interconnected through communication networks.

Some implementations include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, ultra density optical discs, any other optical or magnetic media, and floppy disks. The computer-readable media can store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessor or multi-core processors that execute software, some implementations are performed by one or more integrated circuits, such as application specific integrated circuits (ASICs) or field programmable gate arrays (FPGAs). In some implementations, such integrated circuits execute instructions that are stored on the circuit itself.

As used in this specification and any claims of this application, the terms "computer", "processor", and "memory" all refer to electronic or other technological devices. These terms exclude people or groups of people. For the purposes of the specification, the terms "display" or "displaying" means displaying on an electronic device. As used in this specification and any claims of this application, the terms "computer readable medium" and "computer readable media" are entirely restricted to tangible, physical objects that store information in a form that is readable by a computer. These terms exclude any wireless signals, wired download signals, and any other ephemeral signals.

Many of the above-described features and applications are implemented as software processes that are specified as a set of instructions recorded on a computer readable storage medium (also referred to as computer readable medium). When these instructions are executed by one or more processing unit(s) (e.g., one or more processors, cores of processors, or other processing units), they cause the processing unit(s) to perform the actions indicated in the instructions. Examples of computer readable media include, but are not limited to, CD-ROMs, flash drives, RAM chips, hard drives, EPROMs, etc. The computer readable media does not include carrier waves and electronic signals passing wirelessly or over wired connections.

In this specification, the term "software" is meant to include firmware residing in read-only memory or applications stored in magnetic storage, which can be read into memory for processing by a processor. Also, in some implementations, multiple software aspects of the subject disclosure can be implemented as sub-parts of a larger program while remaining distinct software aspects of the subject disclosure. In some implementations, multiple software aspects can also be implemented as separate programs. Finally, any combination of separate programs that together implement a software aspect described here is within the scope of the subject disclosure. In some implementations, the software programs, when installed to operate on one or more electronic systems, define one or more specific machine implementations that execute and perform the operations of the software programs.

A computer program (also known as a program, software, software application, script, or code) can be written in any form of programming language, including compiled or interpreted languages, declarative or procedural languages, and it can be deployed in any form, including as a standalone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

It is understood that any specific order or hierarchy of blocks in the processes disclosed is an illustration of example approaches. Based upon design preferences, it is understood that the specific order or hierarchy of blocks in the processes may be rearranged, or that all illustrated blocks be performed. Some of the blocks may be performed simultaneously. For example, in certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language claims, wherein reference to an element in the singular is not intended to mean "one and only one" unless specifically so stated, but rather "one or more." Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the subject disclosure.

The predicate words "configured to", "operable to", and "programmed to" do not imply any particular tangible or intangible modification of a subject, but, rather, are intended to be used interchangeably. For example, a processor configured to monitor and control an operation or a component may also mean the processor being programmed to monitor and control the operation or the processor being operable to monitor and control the operation. Likewise, a processor configured to execute code can be construed as a processor programmed to execute code or operable to execute code A phrase such as an "aspect" does not imply that such aspect is essential to the subject technology or that such aspect applies to all configurations of the subject technology.

A disclosure relating to an aspect may apply to all configurations, or one or more configurations. A phrase such as an aspect may refer to one or more aspects and vice versa. A phrase such as a "configuration" does not imply that such configuration is essential to the subject technology or that such configuration applies to all configurations of the subject technology. A disclosure relating to a configuration may apply to all configurations, or one or more configurations. A phrase such as a configuration may refer to one or more configurations and vice versa.

The word "example" is used herein to mean "serving as an example or illustration." Any aspect or design described herein as "example" is not necessarily to be construed as preferred or advantageous over other aspects or design.

In one aspect, a term coupled or the like may refer to being directly coupled. In another aspect, a term coupled or the like may refer to being indirectly coupled.

Terms such as top, bottom, front, rear, side, horizontal, vertical, and the like refer to an arbitrary frame of reference, rather than to the ordinary gravitational frame of reference. Thus, such a term may extend upwardly, downwardly, diagonally, or horizontally in a gravitational frame of reference.

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f), unless the element is expressly recited using the phrase "means for" or, in the case of a method claim, the element is recited using the phrase "step for." Furthermore, to the extent that the term "include," "have," or the like is used in the description or the claims, such term is intended to be inclusive in a manner similar to the term "comprise" as "comprise" is interpreted when employed as a transitional word in a claim.

What is claimed is:

1. A method, comprising:
   providing, by an electronic device during a first period of time, an audio alert comprising a first pattern of sounds, wherein providing the audio alert comprising the first pattern of sounds consumes a first amount of power;
   providing, with the electronic device during a second period of time following the first period of time, a continuation of the audio alert comprising a second pattern of sounds, wherein providing the continuation of the audio alert comprising the second pattern of sounds consumes a second amount of power less than the first amount of power; and
   providing, with the electronic device during a third period of time following the second period of time, a further continuation of the audio alert comprising a third pattern of sounds, wherein providing the further continuation of the audio alert comprising the third pattern of sounds consumes a third amount of power less than the second amount of power.

2. The method of claim 1, wherein the second period of time immediately follows the first period of time and is longer than the first period of time.

3. The method of claim 1, wherein the first pattern of sounds comprises a plurality of siren sounds and a plurality of coded chirps spaced apart, by a gap, from the plurality of siren sounds.

4. The method of claim 3, wherein the second pattern of sounds comprises the plurality of siren sounds and an increased plurality of coded chirps spaced apart, by an increased gap, from the plurality of siren sounds.

5. The method of claim 4, wherein the first pattern of sounds further comprises a first spacing between the siren sounds of the plurality of siren sounds and wherein the second pattern of sounds further comprises a second spacing, greater than the first spacing, between the siren sounds of the plurality of siren sounds.

6. The method of claim 5, wherein the first pattern of sounds further comprises a third spacing between sets of the plurality of coded chirps and wherein the second pattern of sounds further comprises a fourth spacing, greater than the third spacing, between the sets of the plurality of coded chirps.

7. The method of claim 6, wherein the third pattern of sounds comprises a single siren sound and the increased plurality of coded chirps spaced apart from the single siren sound by a further increased gap.

8. The method of claim 7, further comprising providing, with the electronic device, at least one siren sound prior to the first period of time.

9. The method of claim 1, wherein providing the audio alert comprises providing the audio alert responsive to detecting, by the electronic device, an emergency condition associated with a user of the electronic device.

10. The method of claim 9, wherein the electronic device comprises a wearable electronic device.

11. The method of claim 1, wherein providing the continuation of the audio alert comprising the second pattern of sounds during the second period of time comprises providing the continuation of the audio alert comprising the second pattern of sounds responsive to an expiration of the first period of time and acoustically contiguously with the first pattern of sounds.

12. The method of claim 1, wherein providing the continuation of the audio alert comprising the second pattern of sounds during the second period of time comprises providing the continuation of the audio alert comprising the second pattern of sounds responsive to determining, after a first predetermined portion of the first period of time, a battery charge below a threshold for a battery of the electronic device.

13. The method of claim 1, wherein providing the continuation of the audio alert comprising the second pattern of sounds during the second period of time comprises providing the continuation of the audio alert comprising the second pattern of sounds responsive to determining, after a first predetermined portion of the first period of time, a device temperature above a threshold for the electronic device.

14. An electronic device comprising:
   a speaker; and
   one or more processors configured to:
      provide, during a first period of time using the speaker, an audio alert comprising a first pattern of sounds, wherein providing the audio alert comprising the first pattern of sounds using the speaker consumes a first amount of power;
      provide, using the speaker during a second period of time following the first period of time, a continuation of the audio alert comprising a second pattern of sounds, wherein providing the continuation of the audio alert comprising the second pattern of sounds consumes a second amount of power less than the first amount of power; and provide, using the speaker during a third period of time following the second period of time, a further continuation of the audio alert comprising a third pattern of sounds, wherein providing the further continuation of the audio alert comprising the third pattern of sounds consumes a third amount of power less than the second amount of power.

15. The electronic device of claim 14, wherein the second period of time immediately follows the first period of time and is longer than the first period of time.

16. The electronic device of claim 14, wherein the first pattern of sounds comprises a plurality of siren sounds and a plurality of coded chirps spaced apart, by a gap, from the plurality of siren sounds.

17. The electronic device of claim 16, wherein the second pattern of sounds comprises the plurality of siren sounds and an increased plurality of coded chirps spaced apart, by an increased gap, from the plurality of siren sounds, wherein the first pattern of sounds further comprises a first spacing between the siren sounds of the plurality of siren sounds, and wherein the second pattern of sounds further comprises a second spacing, greater than the first spacing, between the siren sounds of the plurality of siren sounds.

18. A non-transitory computer readable medium storing instructions which, when executed by one or more processors, cause the one or more processors to perform operations comprising:

providing, by an electronic device during a first period of time, an audio alert comprising a first pattern of sounds, wherein providing the audio alert comprising the first pattern of sounds consumes a first amount of power;

providing, with the electronic device during a second period of time following the first period of time, a continuation of the audio alert comprising a second pattern of sounds, wherein providing the continuation of the audio alert comprising the second pattern of sounds consumes a second amount of power less than the first amount of power; and providing, with the electronic device during a third period of time following the second period of time, a further continuation of the audio alert comprising a third pattern of sounds, wherein providing the further continuation of the audio alert comprising the third pattern of sounds consumes a third amount of power less than the second amount of power.

19. The non-transitory computer readable medium of claim 18, wherein providing the continuation of the audio alert comprising the second pattern of sounds during the second period of time comprises providing the continuation of the audio alert comprising the second pattern of sounds acoustically contiguously with the first pattern of sounds and responsive to one or more of: an expiration of the first period of time, a battery charge below a threshold for a battery of the electronic device, or a device temperature above a threshold for the electronic device.

20. The electronic device of claim 14, wherein the one or more processors are configured to provide the audio alert responsive to detecting, by the electronic device, an emergency condition associated with a user of the electronic device.

* * * * *